(12) United States Patent
Webman et al.

(10) Patent No.: US 9,514,014 B2
(45) Date of Patent: Dec. 6, 2016

(54) METHODS AND SYSTEMS OF MANAGING A DISTRIBUTED REPLICA BASED STORAGE

(75) Inventors: Erez Webman, Petach-Tikva (IL); Lior Bahat, Kerem Maharal (IL); Eran Borovik, Zikhron-Yaakov (IL); Dvir Koren, Ramat-Yishai (IL); Boaz Palgi, Beit Hanania (IL)

(73) Assignee: EMC IP Holding Company, LLC, Hopkinton, MA (US)

( * ) Notice: Subject to any disclaimer, the term of this patent is extended or adjusted under 35 U.S.C. 154(b) by 101 days.

(21) Appl. No.: 14/239,170

(22) PCT Filed: Aug. 15, 2012

(86) PCT No.: PCT/IL2012/050314
§ 371 (c)(1),
(2), (4) Date: Feb. 17, 2014

(87) PCT Pub. No.: WO2013/024485
PCT Pub. Date: Feb. 21, 2013

(65) Prior Publication Data
US 2014/0195847 A1    Jul. 10, 2014

Related U.S. Application Data

(60) Provisional application No. 61/524,601, filed on Aug. 17, 2011.

(51) Int. Cl.
*G06F 11/00* (2006.01)
*G06F 11/20* (2006.01)
(Continued)

(52) U.S. Cl.
CPC ........ *G06F 11/2094* (2013.01); *G06F 11/1076* (2013.01); *G06F 11/1425* (2013.01); *G06F 11/3442* (2013.01); *G06F 2201/81* (2013.01);
(Continued)

(58) Field of Classification Search
CPC .............................................. G06F 2211/1016
See application file for complete search history.

(56) References Cited

U.S. PATENT DOCUMENTS 7,571,168 B2   8/2009  Bahar et al.
7,636,868 B2   12/2009 Hoffman et al.
(Continued)

FOREIGN PATENT DOCUMENTS

WO    WO 2013/024485    2/2013

OTHER PUBLICATIONS

International Search Report and the Written Opinion Dated Feb. 15, 2013 From the International Searching Authority Re. Application No. PCT/2012/050314.
(Continued)

*Primary Examiner* — Christopher McCarthy
(74) *Attorney, Agent, or Firm* — Krishnendu Gupta; Joseph D'Angelo

(57) ABSTRACT

A method of managing a distributed storage space. The method comprises mapping a plurality of replica sets to a plurality of storage managing modules installed in a plurality of computing units, each of the plurality of storage managing modules manages access of at least one storage consumer application to replica data of at least one replica of a replica set from the plurality of replica sets, the replica data is stored in at least one drive of a respective the computing unit, allocating at least one time based credit to at least one of each storage managing module and the replica data, iteratively renewing the time based credit as long a failure of at least one of the storage managing module, and the at least one drive and the replica data is not detected plurality of storage managing.

20 Claims, 10 Drawing Sheets

(51) Int. Cl.
*G06F 11/14* (2006.01)
*G06F 11/34* (2006.01)
*G06F 11/10* (2006.01)

(52) U.S. Cl.
CPC ... *G06F 2201/815* (2013.01); *G06F 2211/104* (2013.01)

(56) References Cited

U.S. PATENT DOCUMENTS

| | | | |
|---|---|---|---|
| 9,189,316 B2* | 11/2015 | Butterworth | G06F 11/0772 |
| 2004/0255048 A1* | 12/2004 | Lev Ran | G06F 9/546 |
| | | | 709/249 |
| 2006/0187906 A1* | 8/2006 | Bedi | G06F 11/2028 |
| | | | 370/352 |
| 2006/0212453 A1* | 9/2006 | Eshel | G06F 11/2025 |
| 2007/0266218 A1 | 11/2007 | Achiwa | |
| 2008/0065747 A1* | 3/2008 | Kubota | H04L 29/1282 |
| | | | 709/220 |
| 2010/0169392 A1* | 7/2010 | Lev Ran | G06F 9/546 |
| | | | 707/827 |
| 2011/0197024 A1* | 8/2011 | Thomas | G06F 11/2094 |
| | | | 711/114 |
| 2014/0223209 A1* | 8/2014 | Ruster | G06F 1/3228 |
| | | | 713/320 |
| 2014/0325155 A1* | 10/2014 | Marshall | H04L 67/2885 |
| | | | 711/122 |
| 2015/0019809 A1* | 1/2015 | Thomas | G06F 11/2094 |
| | | | 711/114 |

OTHER PUBLICATIONS

Invitation to Pay Additional Fees Dated Nov. 26, 2012 From the International Searching Authority Re. Application No. PCT/2012/050314.

International Preliminary Report on Patentability Dated Feb. 27, 2014 From the International Bureau of WIPO Re. Application No. PCT/2012/050314.

* cited by examiner

METHODS AND SYSTEMS OF MANAGING A DISTRIBUTED REPLICA BASED STORAGE

RELATED APPLICATIONS

This application is a National Phase of PCT Patent Application No. PCT/IL2012/050314 having International filing date of Aug. 15, 2012, which claims the benefit of priority under 35 USC §119(e) of U.S. Provisional Patent Application No. 61/524,601 filed on Aug. 17, 2011. The contents of the above applications are all incorporated by reference as if fully set forth herein in their entirety.

BACKGROUND

The present invention, in some embodiments thereof, relates to distributed storage and, more specifically, but not exclusively, to methods and systems of managing data of a plurality of different storage consumer applications.

As usage of computers and computer related services increases, storage requirements for enterprises and Internet related infrastructure companies are exploding at an unprecedented rate. Enterprise applications, both at the corporate and departmental level, are causing this huge growth in storage requirements. Recent user surveys indicate that the average enterprise has been experiencing a 52% growth rate per year in storage. In addition, over 25% of the enterprises experienced more than 50% growth per year in storage needs, with some enterprises registering as much as 500% growth in storage requirements.

Today, several approaches exist for networked storage, including hardware-based systems. These architectures work well but are generally expensive to acquire, maintain, and manage, thus limiting their use to larger businesses. Small and mid-sized businesses might not have the resources, including money and expertise, to utilize the available scalable storage solutions.

SUMMARY

According to some embodiments of the present invention, there is provided a method of managing a distributed storage space. The method comprises mapping a plurality of replica sets to a plurality of storage managing modules installed in a plurality of computing units, each of the plurality of storage managing modules manages access of at least one storage consumer application to replica data of at least one replica of a replica set from the plurality of replica sets, the replica data is stored in at least one drive of a respective the computing unit, allocating at least one time based credit to at least one of each the storage managing module, the at least one drive and the replica data, and iteratively renewing the time based credit as long a failure of at least one of the storage managing module, the at least one drive and the replica data is not detected.

Optionally, the method further comprises reallocating the replica data to at least one other of the plurality of storage managing modules when the at least one time based credit is not renewed.

Optionally, the method further comprises instructing a respective the storage managing module to reject access of the at least one storage consumer application to the at least one replica.

Optionally, the method further comprises detecting a responsiveness of a respective the storage managing module and determining whether to reallocate the at least one replica to the storage managing module accordingly.

Optionally, the plurality of replica sets are part of a volume stored in a plurality of drives managed by the plurality of storage managing modules.

Optionally, each the replica is divided to be stored in a plurality of volume allocation extents (VAEs) each define a range of consecutive addresses which comprise a physical segment in a virtual disk stored in the at least one drive.

Optionally, each of a plurality of volume allocation extents (VAEs) of each of the plurality of replicas is divided to be stored in a plurality of physical segments each of another of a plurality of virtual disks which are managed by the plurality of storage managing modules so that access to different areas of each the VAE is managed by different storage managing modules of the plurality of storage managing modules.

Optionally, the plurality of computing units comprises a plurality of client terminals selected from a group consisting of desktops, laptops, tablets, and Smartphones.

Optionally, each the storage managing module manages a direct access of the at least one storage consumer application to a respective the at least one replica.

Optionally, the mapping comprises allocating a first generation numerator to mapping element mapping the storage of the replica data, the reallocating comprises updating the first generation numerator; further comprising receiving a request to access the replica data with a second generation numerator and validating the replica data according to a match between the first generation numerator and the second generation numerator.

Optionally, the method further comprises performing a liveness check to the plurality of storage managing modules and performing the renewing based on an outcome of the liveness check.

Optionally, the replica set is defined according to a member of a group consisting of the following protocols: Redundant Array of Independent Disks (RAID)-0 protocol, RAID-1, RAID-2, RAID-3, RAID-4, RAID-5 and RAID-6, RAID 10, RAID 20, RAID 30, RAID 40, RAID 50, RAID 60, RAID 01, RAID 02, RAID 03, RAID 04, RAID 05, and RAID 06; wherein the replica comprises at least one of a replica of data of a set of data elements and a parity of the set of data elements.

According to some embodiments of the present invention, there is provided a system of managing a distributed storage space. The system comprises a plurality of storage managing modules installed in a plurality of computing units and manages the storage of a plurality of replica sets, each the storage managing module manages access of at least one storage consumer application to replica data of at least one replica of a replica set from the plurality of replica sets, the replica data is stored in at least one drive of a respective the computing unit, and a central node which allocates at least one time based credit to at least one of each the storage managing module and the replica data. The central node iteratively renews the time based credit as long a failure of at least one of the storage managing module, the at least one drive and the replica data is not detected.

Optionally, the central node reallocates the replica data to at least one other of the plurality of storage managing modules when the at least one time based credit is not renewed.

According to some embodiments of the present invention, there is provided a method of managing a data-migration operation. The method comprises using a first storage managing module of a plurality of storage managing modules to manage access of a plurality of storage consumer applications to a plurality of data blocks of data stored in at least one drive, identifying a failure of at least one of the first storage managing module and the at least one drive, initializing a rebuild operation of the data by forwarding of the plurality of data blocks to be managed by at least one other of the plurality of storage managing modules in response to the failure, identifying, during the rebuild operation, a recovery of at least one of the first storage managing module and the at least one drive, and determining per each of the plurality of data blocks which has been or being forwarded, whether to update a respective the data block according to changes to another copy thereof or to map the respective data block to be managed by the at least one other storage managing module based on a scope of the changes.

Optionally, the method further comprises limiting a number of data blocks which are concurrently forwarding during the rebuild operation.

Optionally, the identifying a failure is performed after a waiting period has elapsed.

Optionally, the method further comprises performing at least one of the rebuild operations according to the determining and rebalancing the plurality of storage managing modules according to the outcome of the rebuild operation.

Optionally, the rebalancing is performed according to a current capacity of each the plurality of storage managing modules.

Optionally, the determining comprises identifying the changes in at least one virtual disk in a copy of the plurality of data blocks of the at least one other storage managing module.

According to some embodiments of the present invention, there is provided a system of managing a data-migration operation. The system comprises a plurality of storage managing modules each manages access of a plurality of storage consumer applications to a plurality of data blocks of data stored in at least one drive and a central node which identifies a failure of a first of the plurality of storage managing modules. The central node initializes a rebuild operation of the data by instructing the forwarding of the plurality of data blocks to be managed by at least one other of the plurality of storage managing modules in response to the failure, identifies, during the rebuild operation, a recovery of at least one of the first storage managing module and the at least one drive, and determines per each of the plurality of data blocks which has been or being forwarded to the at least one storage managing module, whether to acquire changes thereto or to map the respective data block to be managed by the at least one other storage managing module based on a scope of the changes.

According to some embodiments of the present invention, there is provided a method of managing a distributed storage space. The method comprises mapping a plurality of replica sets to a storage space managed by a plurality of storage managing modules installed in a plurality of computing units, each of the plurality of storage managing modules manages access of at least one storage consumer application to replica data of at least one replica of a replica set from the plurality of replica sets, the replica data is stored in at least one drive of a respective the computing unit, monitoring a storage capacity managed by each of the plurality of storage managing modules while the plurality of storage managing modules manage access of the at least one storage consumer application to the replica set, detecting an event which changes a mapping of the storage space to the plurality of storage managing modules, and rebalancing the storage space in response to the event by forwarding at least some of the replica data managed by a certain of the plurality of storage managing modules to at least one other storage managing module of the plurality of storage managing modules.

Optionally, the event comprises an addition of at least one new storage managing module to the plurality of storage managing modules, the rebalancing comprises forwarding at least some of the replica data to the at least one new storage managing module.

Optionally, the event comprises an initiated removal of at least one of the plurality of storage managing modules.

Optionally, the event comprises a change in a respective the storage capacity of at least one of the plurality of storage managing modules.

Optionally, the rebalancing comprises detecting a failure in one of the plurality of storage managing modules during the rebalancing and scheduling at least one rebalancing operation pertaining to the rebalancing according to at least one data forwarding operation pertaining to a recovery of the failure.

Optionally, the replica set is stored in a plurality of virtual disks (VDs) which are managed by the plurality of storage managing modules, the rebalancing is performed by forwarding a group of the plurality of virtual disks among the plurality of storage managing modules.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL
VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DETAILED DESCRIPTION

Figure 1:
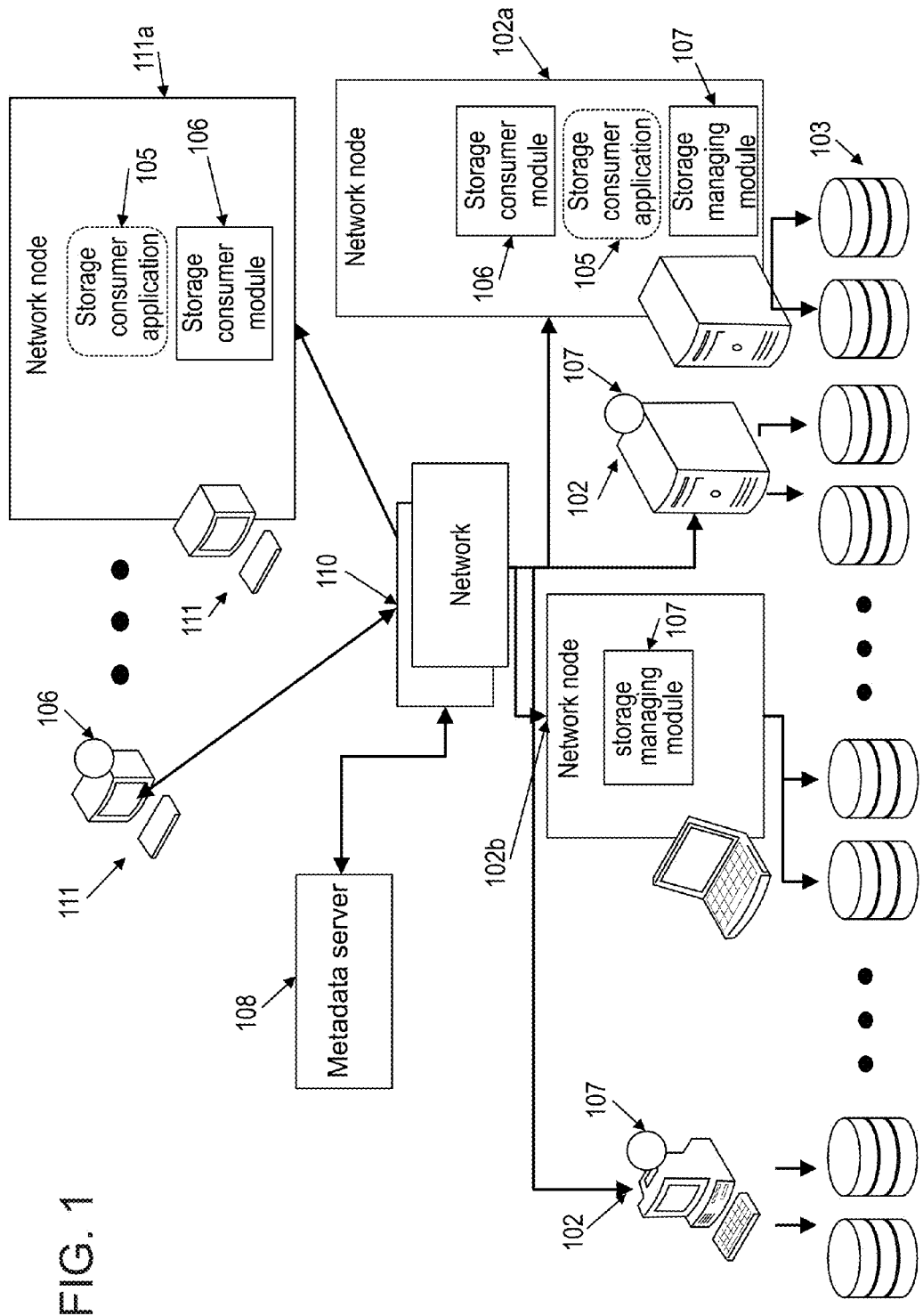
FIG. 1 is a schematic illustration of a storage system that manages a virtual layer of storage space that is physically distributed among a plurality of different network nodes, including client terminals, according to some embodiments of the present invention.

The present invention, in some embodiments thereof, relates to distributed storage and, more specifically, but not exclusively, to methods and systems of managing data of a plurality of different storage consumer applications.

According to an aspect of some embodiments of the present invention, there is provided methods and systems of managing a distributed storage space wherein the validity of data blocks or the entities which manage these data blocks is updated without having to inform data accessing entities. The method allows a storage consumer module to route I/O commands from a plurality of storage consumer applications without having access to up-to-date information about failures and/or functioning of storage managing modules which receive and optionally executes the I/O commands.

Optionally, the method is based on a time based credit that is allocated to each of a plurality of storage managing modules which manage the access to data and/or to drives which are managed these modules and/or to the data itself. The time based credit is iteratively renewed as long a failure to the storage managing module, the respective drives, and/or data is not detected. This allows reallocating data managed by a certain storage managing module to be managed by other storage managing modules when a respective time based credit is not renewed. Optionally, the data is replica data, for example continuous data blocks of a replica from a set of replicas, for example a set of replicas defined by a RAID protocol.

According to an aspect of some embodiments of the present invention there are systems and methods of managing a recovery data-migration operation wherein each one of a set of data blocks managed by a reviving storage managing module is either forwarded to be managed by one or more other storage managing modules and/or rebuilt based on an analysis of changes made thereto during the data-migration operation. Optionally, data managed by the storage managing modules is rebalanced after the data-migration operation ends.

According to an aspect of some embodiments of the present invention there are systems and methods of managing a distributed storage space wherein replica sets are mapped to a storage space managed by storage managing modules which installed in a plurality of computing units, for example as outlined above and the described below. The storage capacity that is managed by each of the storage managing modules is monitored in real time, while the storage managing modules manage access of one or more storage consumer applications to the replica sets. When an event which changes a mapping of the storage space to storage managing modules is detected, the storage space is rebalanced, for example by forwarding replica data from one or some storage managing modules to other storage managing modules.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 is a schematic illustration of a storage system 100 that manages a virtual layer of storage space that is physically distributed in a plurality of storage units 103, referred to herein as drives, of a plurality of network nodes 102, including client terminals, according to some embodiments of the present invention. Optionally, the storage system 100 provides access to storage blocks, referred to herein as blocks. The network nodes are optionally computing units, such as client terminals, which are used not only as storage managing modules but also as storage consumers who executes storage consumer applications, for example laptops, desktops, tablets, and/or the like.

The storage system 100 realizes a shared storage and/or a virtual storage area network by using the local and/or attached drives 103 (e.g. directly or indirectly attached drives) of the network nodes 102, without requiring external storage subsystems. The system 100 optionally uses drives 103 such as local disks of computing units of an organization with underutilized abilities and optionally not or not only drives of storage area network (SAN) functional components (FCs). In such a manner, as described below, the system 100 provides shared storage benefits using existing computing devices and therefore may reduce deployment and maintenance costs in relation to external storage services. The storage system 100 runs processes that provide fault tolerance and high availability. The storage system 100 may manage the drives 103 in a relatively large scale, for example few hundreds, thousands, or even more, for example across a very large number of network nodes, and hence, in many scenarios, outperform existing external storage subsystems, as the aggregated memory, CPU and I/O resources of the network nodes 102 is higher relatively to the memory, CPU and I/O resources found in a common external storage.

The storage system 100 provides services to storage consumer applications 105 which are hosted in network nodes 102 which are associated with the drives 103 of the storage space and/or in network nodes 111 without such drives. As used herein, a storage consumer application (105) means any software component that accesses, for example for read and/or writes operations, either directly or via a file system manager, the storage space that is managed by the storage system 100.

An exemplary network node (111) without drives which are used by the system 100, is a client storing one or more storage consumer applications 105, may be, for example, a conventional personal computer (PC), a server-class computer, a virtual machine, a laptop, a tablet, a workstation, a handheld computing or communication device, a hypervisor and/or the like. Exemplary network node (102) with drives which are used by the system 100 is optionally a computing unit that manages one or more drives 103, for example any of the above client examples. 111a and 102a are respectively a schematic illustration of components in some or all of the network nodes 111 and a schematic illustration of components in some or all of the network nodes 102 and may be referred to interchangeability.

As outlined above, the system 100 manages a storage space in the drives 103. Generally speaking, a storage space has well-defined addressing. A write I/O command writes specific data to specific address(es) within the storage space, and a read I/O reads the stored data. The storage space is optionally a block storage space organized as a set of fixed sized blocks, each having its own address. Consider for example a storage space consisting of a set of drives, for example small computer system interface (SCSI) devices where each drive is addressed as an array of blocks where the size of each block is pre-defined, for example 512 bytes. Non-block storage methodologies or storage methodologies with dynamic block size may also be implemented in the storage space.

Optionally, in order to communicate with the storage consumer modules 106 in the network nodes 102, the storage consumer applications (105) may manage a logical file system that generates read and/or write commands, also referred to herein as input and/or output (I/O) commands.

Each network node 102 includes or manages one or more drives, such as 103, for example, conventional magnetic or optical disks or tape drives, non-volatile solid-state memory units, such as flash memory unit, and/or the like. The system 100 manages a storage space that spreads across the drives 103. For example, a drive may be any internal or external disk accessible by the network node 102, a partition in a hard disk, or even a file, a logical volume presented by a logical volume manager, built on top of one or more hard disks, a persistent media, such as Non-volatile memory (NVRAM), a persistent array of storage blocks, and/or the like. Optionally, different drives 103 provide different quality of service levels (also referred to as tiers).

Optionally, the storage space is divided to a plurality of volumes, also referred to as partitions or block volumes. In use, a storage consumer application 105 hosted in any of the network nodes 102, 111 interacts with one or more volumes.

Optionally, the system includes an outbound component that is responsible for managing the various mappings of blocks, for example a metadata server 108. The metadata server 108 may be implemented in any network node. According to some embodiments of the present invention, a number of metadata servers 108 are used for high-availability, for example arranged by a known clustering process. In such an embodiment, the metadata servers 108 are coordinated, for example using a node coordination protocol. For brevity, a number of metadata servers 108 are referred to herein as a metadata server 108.

One or more of the components referred to herein are implemented as virtual machines, for example one or more of the network nodes 102, the metadata server 108. These virtual machines may be executed on a common computational device. Optionally, the metadata server 108 is hosted on a common computational unit with one of a storage managing module 107 and/or a storage consumer module 106.

Each of some or all of the network nodes 111, 102 executes a storage consumer module 106, for example a software component, an add-on, such as operating system add-on, an I/O stack driver and/or the like.

Each network node 102 that manages one or more drives 103 executes a storage managing module 107, for example as shown at 102b. In use, write commands sent by one of the consumer storage applications 105 are forwarded to one of the storage consumer modules 106. The storage consumer module 106 forwards the write commands, usually via interconnect network(s) (110) to be handled by the storage managing module 107. The storage managing module 107 performs the write operation, for example either directly and/or by instructing one or more storage managing modules 107 to perform the write operation or any portion thereof. Once handling completes, the storage managing module 107 may send an acknowledgment to the storage consumer module 106 (that may forward it to the consumer storage applications 105) via the logical networks (110). The interconnect networks (110) may either a physical connection, for example, when the storage consumer module 106 and the storage managing module 107 are located in two separate network nodes 102 or a logical/software interconnect networks if, for example, these modules are situated in the same network node 102. For example, a write command may allow modifying a single block and/or a set of sequential blocks. Typically, failure of a write command may result in a modification of a subset of the set of sequential blocks or in no modification at all. Optionally, when a write command fails, each of the addressed blocks is either completely modified or completely untouched.

Reference is now made a description of an I/O operation initiated by one of the storage consumer application 105 in FIG. 1 from the storage consumer application 105 point of view. The storage consumer application 105 issues a read command that is received by the local storage consumer module 106. The local storage consumer module 106 matches the read command with a mapping table, optionally local, to identify the storage managing module 107 that manages a relevant storage block. Then the local storage consumer module 106 sends a read request to the storage managing module 107 that manages drives 103 with which the read address is associated via the interconnect network 110. The storage managing module 107 reads, either directly and/or by instructing one or more other storage managing module 107, the required data from the respective drive 103 and returns the data to local storage consumer module 106, via the network(s) 110. The local storage consumer module 106 receives the data and satisfies the read request of the storage consumer application 105.

Optionally, behavior and semantics of a read command follow the same principles as described above for the write command. Optionally, if commands are sent concurrently before any acknowledgment is received, the order of execution by the storage consumer module 106 is not guaranteed.

From a storage consumer application's perspective, I/O execution time is a period starting when the storage consumer application sends an I/O command until it receives its completion. In the real-world, storage consumer applications typically expect the I/O commands to execute relatively fast, for example within few milliseconds (mSec); however, it is typically understandable that a relatively big variance may be expected in I/O execution time, for example, sub-mSec for read cache hits, 5-10 mSec for cache misses, up to 100-500 mSec for a heavily loaded system, 5-10 seconds during internal storage failovers etc. Storage consumer applications are optionally set to deal with I/O operations that ended with an error or never ended. For example, storage consumer applications place a time-out, referred to herein as an application time-out, for an I/O operation before they decide not to wait for its completion and start an error recovery. The application timeout is typically larger (or considerably larger) than the time it takes for storage space providers to perform internal failovers. For clarity, this document assumes a timeout of 30 seconds (although the invention is applicable to any timeout value).

Reference is now made to a process of mappings volume addresses of a storage space to drives 103. The mapping may involve mapping storage managing modules 107 to storage tasks, for instance the identities of storage managing modules 107 are used for redundant array of independent disks (RAID) scheme maintenance.

The physical storage of the system 100 comprises the plurality of drives 103 from different network nodes 102 that host a common storage space. Data in each drive 103 is set to be accessed according to requests from various storage consumer modules 106. Each drive may include a plurality of partitions, each assigned to a different group of storage managing modules 107. For brevity, a partition may also be referred to herein as a drive.

The mapping scheme is optionally a function that maps each volume block address to one or more physical block addresses that realizes its storage in one or more replicas stored in one or more of the drives 103, optionally together with an identifier of a storage managing module 107 that handles I/O requests to read and/or right the volume block. For example, a mapping entry may map a logical block with the following unique identifier (ID) [Volume=5, block=8] to network nodes 102 managed by certain storage managing module 107, in certain blocks, in certain drives, for instance as defined by the following unique IDs [Storage managing module=17, Drive=70, Block=88] and [Storage managing module=27, Drive=170, Block=98] where the I/O request is handled by storage managing module defined by the following unique ID [Storage managing module=17].

As described above, different storage managing modules 107 may manage different partitions. Optionally, each storage consumer modules 106 accesses a mapping table or a reference to a mapping table that maps logical blocks to storage managing modules 107. When an I/O command is received by the storage managing module 17, the storage managing module 17 matches the unique ID of the logical block with a physical address in one of the drives which associated therewith.

For instance, in the following example, when a storage consumer modules 106 receives an I/O command with the following unique ID [Volume=5, block=8] accesses a mapping table and identify a matching storage managing module 107 [Storage managing module=17]. The storage consumer modules 106 forwards the I/O command to respective storage managing module 17. The respective storage managing module 107 matches the unique ID [Volume=5, block=8], which is a RAID layer 1 (RAID1) volume, to a physical address of a first copy [Disk=70, Block=88], optionally primary, and optionally information indicative of a storage managing module 107 storing a second copy, for instance [storage managing module=27]. The storage managing module 107 (i.e. the primary) may forward the I/O command to storage managing module 27 the unique ID [Volume=5, block=8] that uses it to identify an address [disk=170, block=98] and to perform the I/O command.

The mapping scheme may be static or dynamically change over time.

Figure 2:
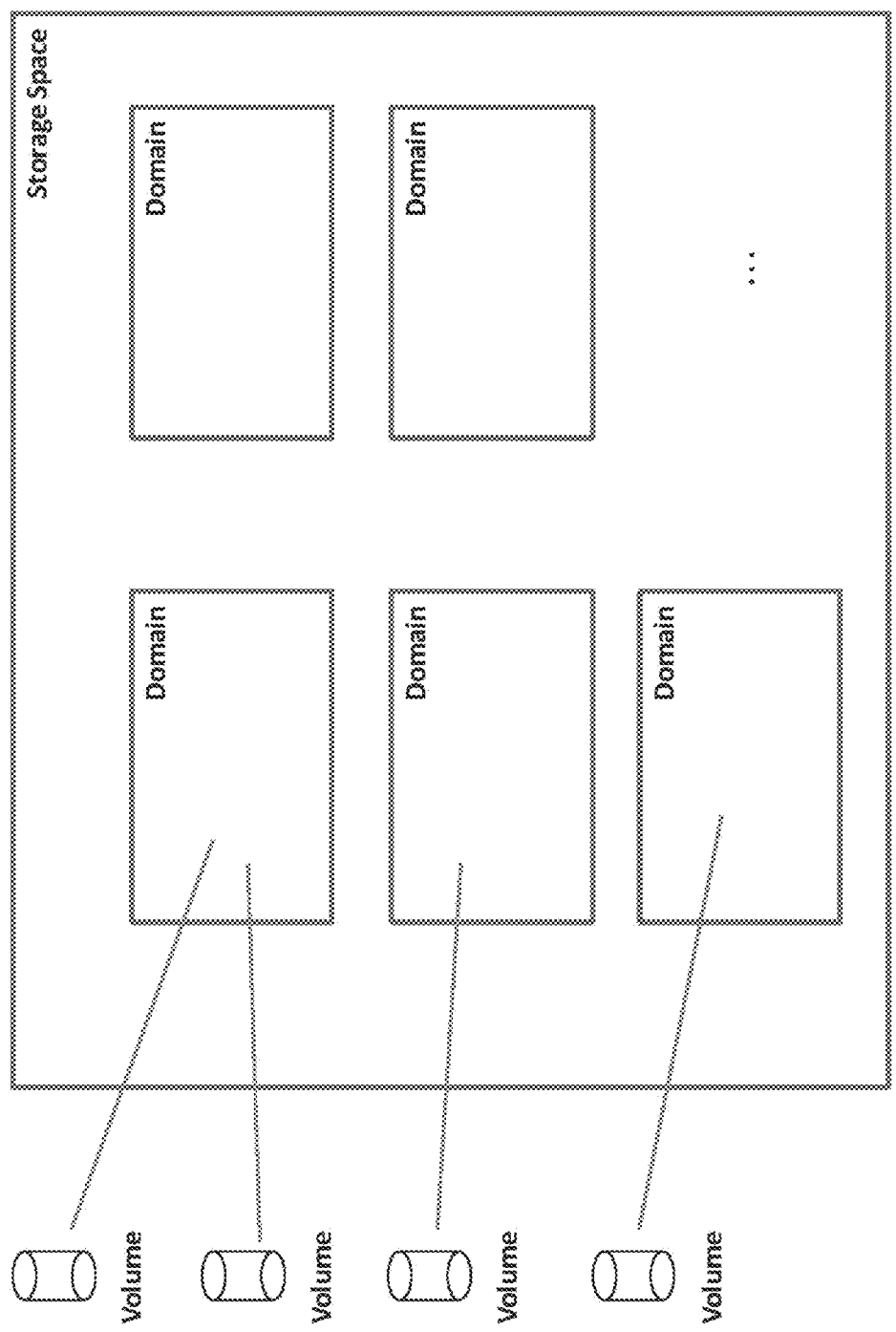
FIG. 2 is a schematic illustration of a storage space, according to some embodiments of the present invention.
Figure 3:
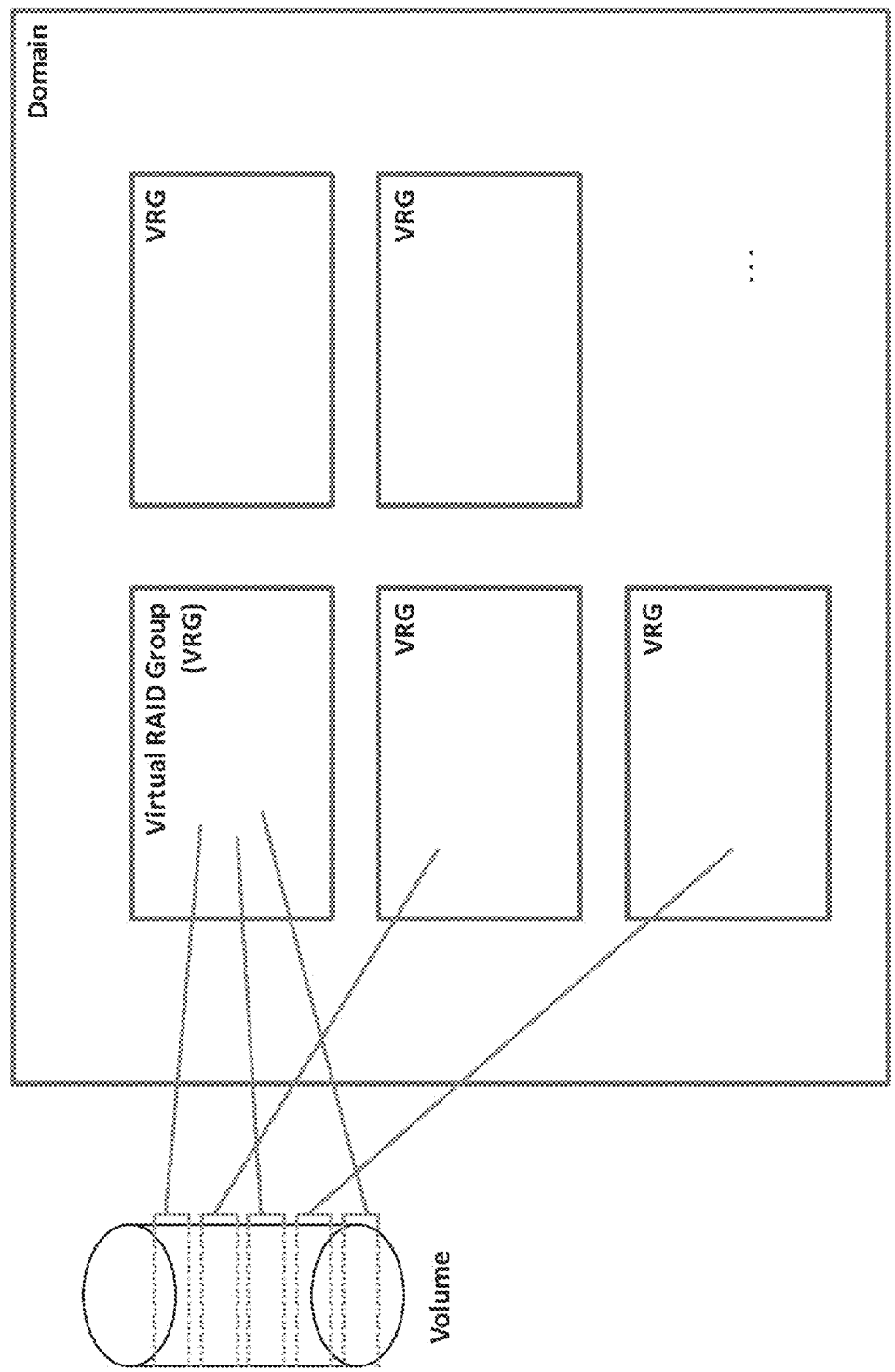
FIG. 3 is a schematic illustration of a plurality of replica sets in a domain and the mapping thereof to a volume, according to some embodiments of the present invention.

Reference is now made to FIG. 2, which is a schematic illustration of a storage space, according to some embodiments of the present invention. As described herein, volume partitions may be mapped to storage managing modules 107 and to drives. Optionally, the storage space is a non-fully-consecutive address space that represents a set of different storage capacities allocated for storing data blocks of different volumes. Optionally, the storage space that is managed by the system 100 is a divided to domains. Each domain is a subspace of addresses, optionally non consecutive, that is optionally associated with certain storage properties. Each domain is allocated for storing certain block volumes. A volume is fully mapped to a domain. Multiple volumes may be mapped to the same domain. A domain optionally consists of one or more sets of replicas, referred to herein as replica sets or virtual RAID groups (VRGs). A VRG that include one or more replicas of data is a sub space of the storage space, optionally non consecutive, that represents addresses of a storage with certain properties that is allocated for storing data blocks of volumes. As discussed below and depicted in FIG. 3, a volume may be mapped to multiple VRGs of the same domain. Optionally, the volume may not be divided in a balanced manner among the multiple VRGs. A replica set optionally contains a number of replicas, for example N virtual RAID0 groups (VR0Gs), where N depends on the high-level RAID level (e.g. 1, 4, 3-copy 1 and the like). Examples: RAID1 requires 2 similar VR0Gs, one acting as a primary copy and the second as the secondary (minor) copy and RAID4 requires at least 3 similar VR0Gs where one of them acts as a parity and 3-Copy-RAID 1 requires 3 similar VR0Gs, where one is a primary copy and the second and third acting as minors. If no redundancy is applied, only a single VR0G is required. For brevity, a parity I also referred t herein as a replica.

Figure 4:
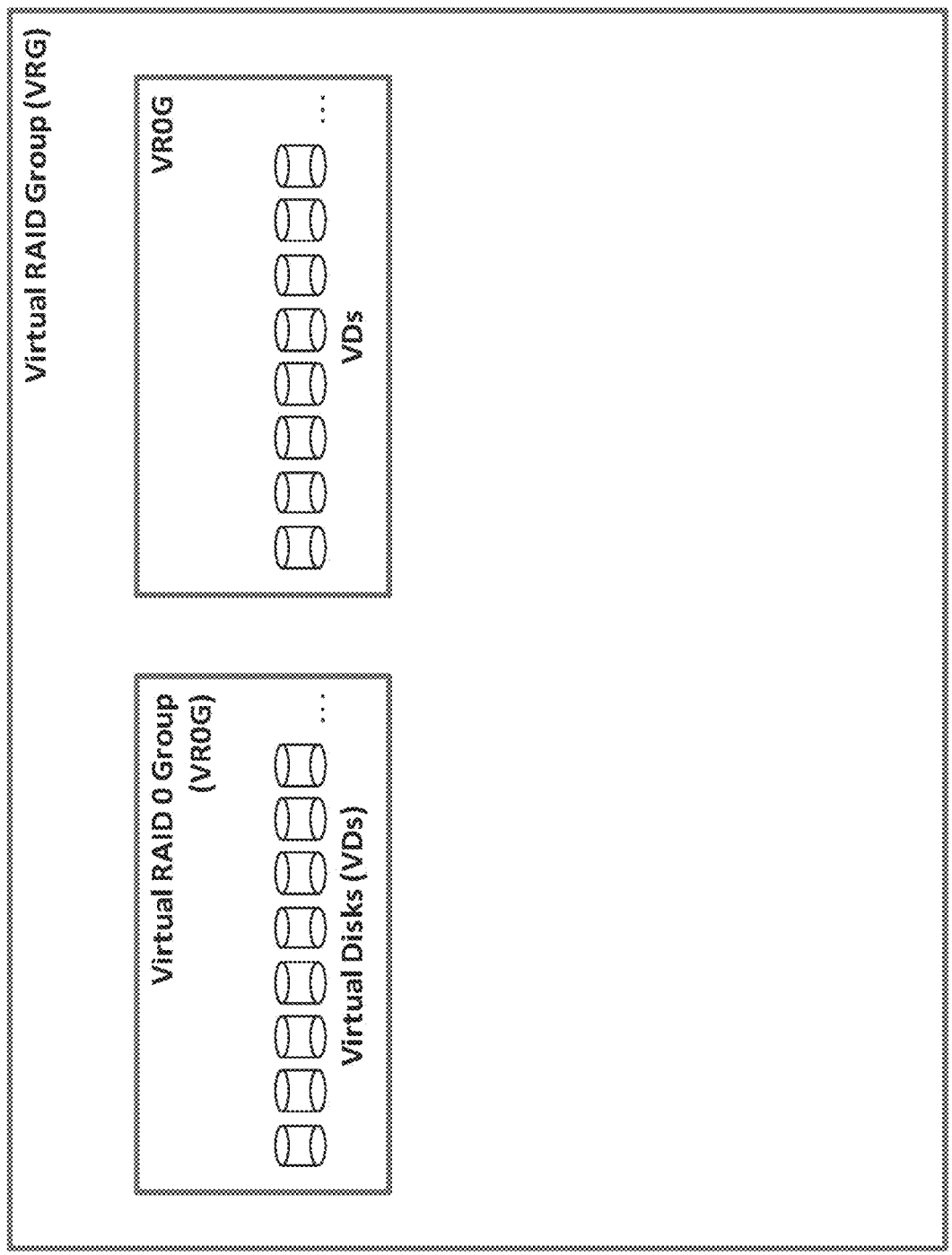
FIG. 4 is a schematic illustration of a plurality of virtual disks in each replica of a replica set, according to some embodiments of the present invention.
Figure 7:
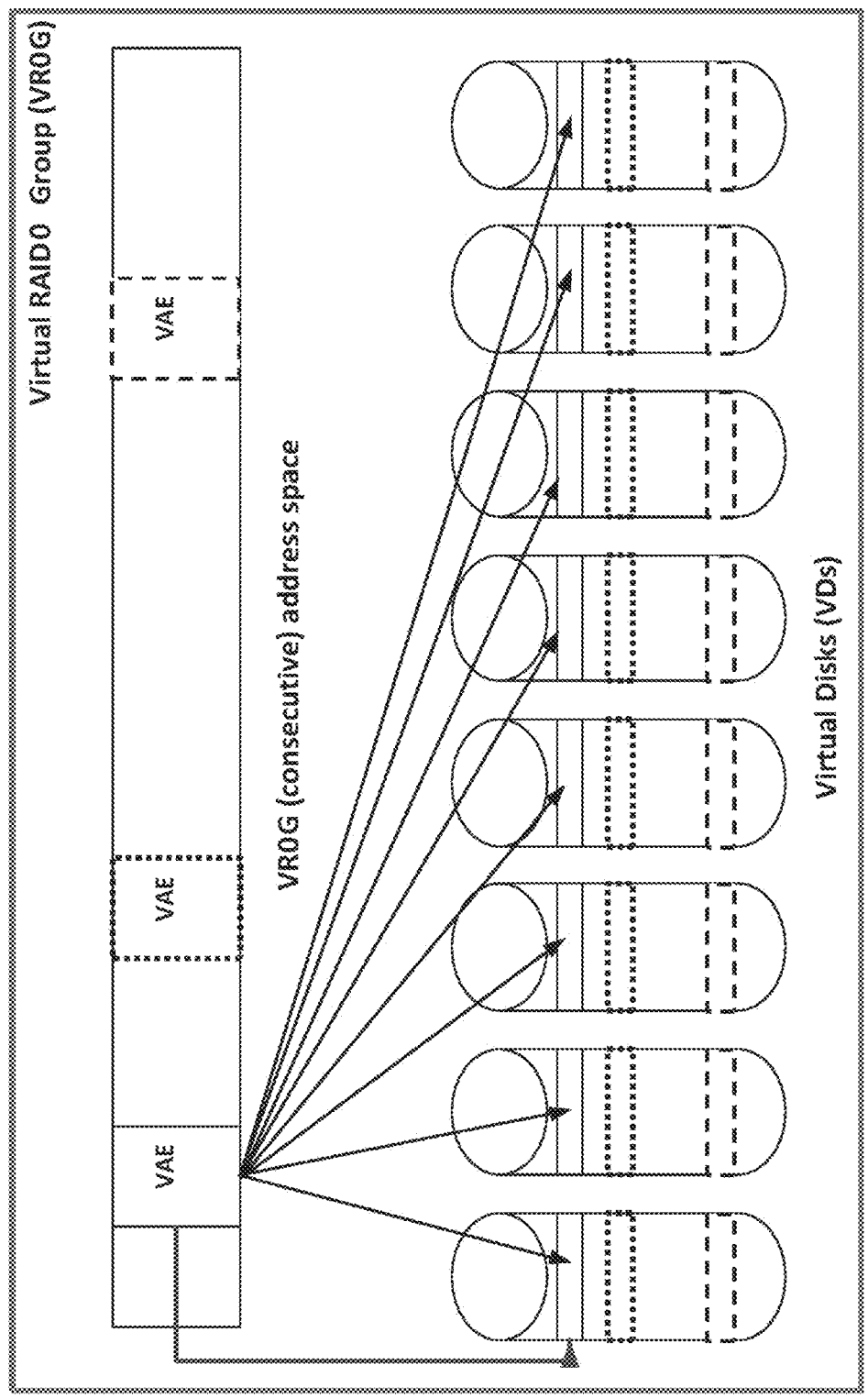
FIG. 7 is a schematic illustration of an address space of a replica and the distribution of the volume allocation extents among a number of different virtual disks, according to some embodiments of the present invention.

As shown at FIG. 4 and in FIG. 7, a replica (e.g. VR0G) may be divided to a plurality of continuous data blocks, referred to herein as volume allocation extents (VAEs), which may be stripped along a set of N virtual disks (VDs), optionally equally sized. A VD is a consecutive address space of M blocks which are managed by a single storage managing module 107, optionally among other VDs. A VD may or may not have a 1:1 mapping with any physical disk in the system 100. Optionally, each replica space is divided to VAEs which are symmetrically striped across all its VDs, optionally as any standard RAID0 disk array. Note that each VAE may be divided to stripes having equal size fragments, for example, a 16 megabyte (MB) VAE may stripped along 16 VDs with a fragment size of 1 MB.

Figure 5:
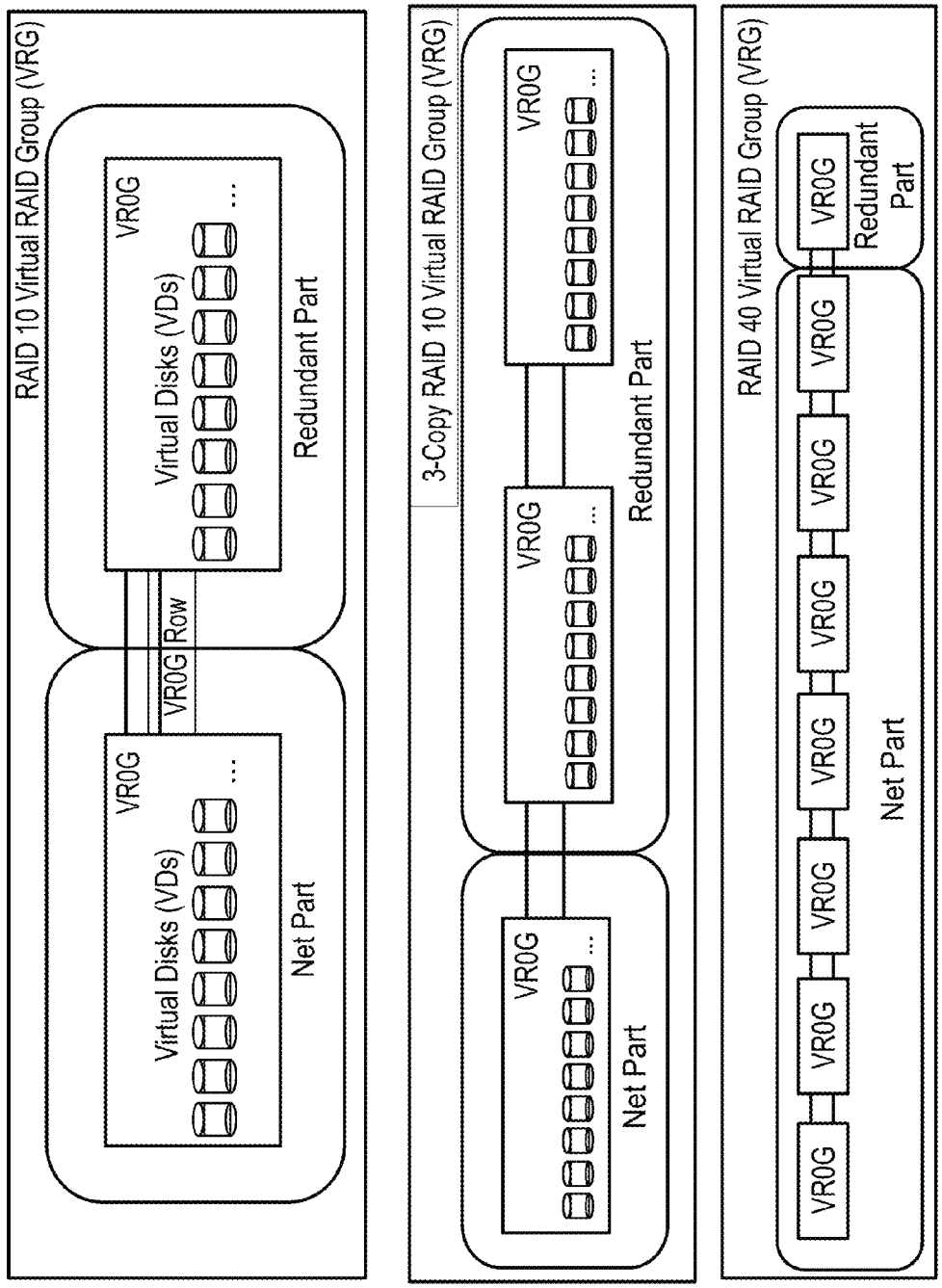
FIG. 5 is a schematic illustration of a plurality of replica sets each arranged according to a different RAID scheme, according to some embodiments of the present invention.

As depicted in FIG. 5, a replica set is divided to a net part and a redundant part; each includes one or more replicas (e.g. VR0Gs). For example, in RAID 10, where data is written twice, the net part of a VRG is 1 VR0G. The non-net part of the VRG is denoted hereafter as one or more replicas, parity part, and/or a redundant part.

Figure 6:
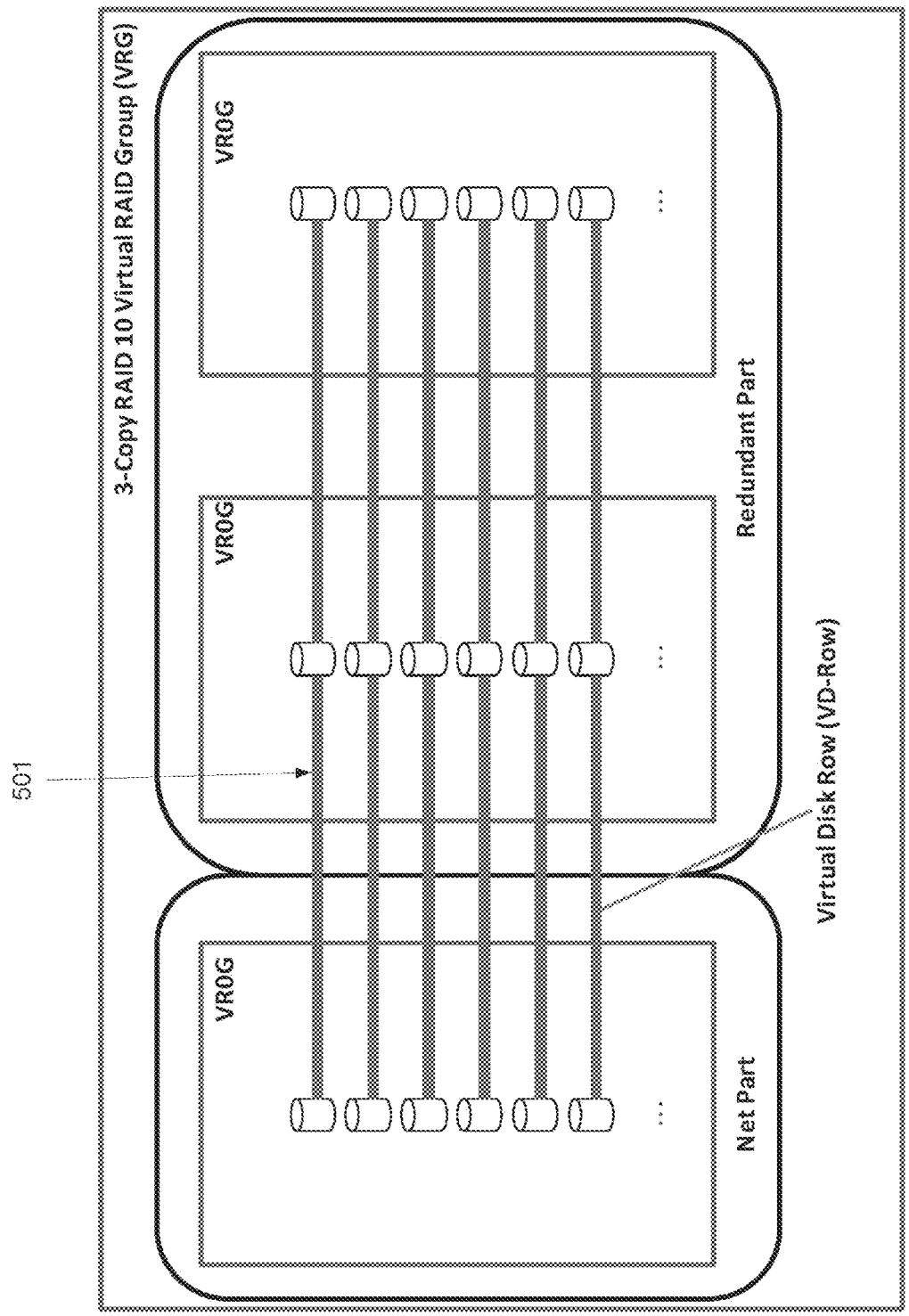
FIG. 6 is a schematic illustration of a plurality of virtual disk rows each includes copies of an origin virtual disk which are distributed in a plurality of different replicas of a replica set, according to some embodiments of the present invention.

Optionally, as depicted in FIG. 6, a row of VDs (VD-Row), a set of respective VDs allocated to store the replicas of a replica set (e.g. the VR0Gs of a VRG), for example as 501. Optionally, a replica set consists of similar replicas which are similar in size and in number of VDs; however, different replica sets in the same domain may be of different RAID schemes and may contain different replicas, for example any of RAID-0, RAID-1, RAID-2, RAID-3, RAID-4, RAID-5 and RAID-6, RAID 10, RAID 20, RAID 30, RAID 40, RAID 50, RAID 60, RAID 01, RAID 02, RAID 03, RAID 04, RAID 05, and RAID 06.

Reference is now made to processes of mapping volumes to domains of a storage space. The mapping maps any block of any volume to an exclusive block address in the domain, for example to a specific block offset within a replica of the domain. Any block in a replica represents at most a single specific block in a specific volume.

In some embodiments of the present invention, each replica is logically divided into ranges of consecutive addresses, for example VAEs as outlined above. The VAE is optionally a fixed-size object. Optionally, VAEs are of multiple sizes that fit volumes in various sizes. The size of the VAE is multiple of the replica stripe size. The replica size is optionally a multiple of the VAE size.

As shown in FIG. 7, each VAE in a replica is striped across all VDs, optionally equally hits all VDs. VAE-VD intersection is defined to be the area in a VAE that is covered by a specific single VD.

Optionally, the VAEs are used as building blocks of one or more volumes which are assigned for one or more storage consumer applications 105. In such embodiments, available VAEs may be allocated to volumes according to an allocation process. In such embodiments, mapping between volumes and domains is represented by an array of VAE identifiers. For example, available (e.g. unused) VAEs are arranged in a queue, optionally in any arbitrary order. Then, new space is allocated by getting sufficient VAEs from the queue, referred to herein as a free queue. Each volume may be resized by acquiring VAEs from the free-queue (or returning some) and/or returning VAEs to the free-queue. When a volume is deleted all the VAEs are returned to the free-queue.

Reference is now made to the mapping of a storage space to drives, such as 103, or elements thereof. Drives managed by certain storage managing modules 107 are optionally set to a certain domain that is associated therewith.

Similarly, the mapping of volumes of different storage consumer applications 105 to domains, any block of any replica is mapped to an exclusive block address in one of the drives. In use, a replica address that is associated with a certain volume is mapped to a drive address. Optionally, information mapping from a replica address to a respective storage managing module 107 is distributed to storage consumer modules 106 and mapping information indicative of respective drive addresses is provided and managed by the storage managing modules 107, for example as exemplified above. This reduces the size of the memory footprint of the storage consumer module 106 and/or the data it has to acquire. Moreover, in such an embodiment, a storage managing module 107 is more authoritative regarding the respective drives it controls.

According to some embodiments of the present invention, VDs and/or replicas are dynamically weighted to indicate the amount of volume data they currently represent. For example, the weight is the number of VAEs which are in use in relation to the total available VAEs in a VD. For brevity, the weight is defined as n/m where n denotes used VAEs and m denotes total available VAEs. For example, suppose various configuration parameters are such that each VR0G contributes 64 VAEs to a domain, and the size of each VD is 1 GB. Suppose $VR0G_1$ has all its 64 VAEs in use (i.e., allocated for volumes). Each of the $VR0G_1$'s VDs represents 1 GB of volume data. Suppose $VR0G_2$ has only 2 (out of 64) VAEs in use. Each of $VR0G_2$'s VDs represents 2* (1 GB/64)=32 MB of Volume data. In this example, the weight 0/64 is assigned to an empty VD, 64/64 is assigned to a full VD, and 2/64 is assigned to a VD in which 2 VAEs are in use—assuming our example of 64 VAEs per VD. When all the VDs in the VR0G inherently have the same weight, VR0G Weight is defined to be the weight of its VDs.

In RAID 1 VRG, the redundant VR0G has an identical weight as a net VR0G. In RAID N+1 (e.g., RAID 4) VRG, while all N VR0G may have different weights as the weight of a parity VR0G varies.

Each drive has n separate physical segments, each extends along a Y MB used for storing user-data and/or RAID parity information, user-data where Y denotes size of the VAE/VD intersection. Each physical segment describes a single intersection between a specific VD managed by a certain storage managing module 107 and a specific VAE of a replica that is stored in the VD.

Reference is now made to the mapping of VDs to physical segments and storage managing modules 107. Optionally, a drive is divided to concrete, consecutive, physical segments which optionally allocated to VDs. The physical segments may be defined as logical entities. This facilitates thin provisioning functionality, snapshots functionality, performance balancing across the multiple drives and/or the like.

Optionally, each VD is mapped to a storage managing module 107 and each used VD/VAE intersection is mapped to a physical segment. In such embodiments, a single physical segment is associated with no more than a single VD.

Optionally, the mapping information is distributed so that storage consumer modules 106 are updated with data mapping VDs to a respective storage managing modules 107 and metadata server 108 and data mapping physical segments is accessed by the respective storage managing module 107. In such a manner, the storage managing module 107 locally and authoritatively maintains segment distribution data. This means that storage consumer modules 106 do not have to be updated with internal changes in the allocation of segments.

Optionally, each storage managing module 107 allocates drive space, for example physical segments, for each VD according to its weight. Optionally, the actual allocation is made when a write command is received.

According to some embodiments of the present invention, mapping is made according to one or more constraints to increase performance and/or scalability. The constraints may be similar to all storage managing modules 107 or provided in asymmetric configurations.

One exemplary constraint sets that when RAID protocol is implemented, VDs of a common VD-Row are mapped to different storage managing modules 107 so as to assure redundancy in case of a failure of one or more storage managing modules 107 and/or to avoid creating bottle neck storage nodes. In these embodiments, a VD-Row of N VDs are be mapped to N different storage managing modules 107.

As described above, different network nodes 102 may manage different number of drives which optionally have different storage capacity and/or number of spindles. Therefore, storage managing modules 107 are potentially asymmetric. Optionally, in another exemplary constraint, in order to increase the balance between the storage managing modules 107, data is spread according to a weighted score given to storage managing modules 107 based on cumulative drive capacity, for example amount of physical segments it manages. The weighted score may be calculated as a ratio between in use physical segments and the total physical segments which are available for a certain storage managing module 107.

In a domain, at a given moment, as each replica may have a different weight, there may be VDs of various weights. Optionally, in one exemplary constraint, all of the storage managing modules 107 own VDs of similar weight distribution. In exemplary constraint, each of the storage managing modules 107 manage as equal number of VDs of each replica as possible. In another exemplary constraint, similar storage managing module 107 combinations are not used for more than one more VD-rows.

In another exemplary constraint, neighboring VDs are not assigned to the same storage managing module. For example, when VD1 is owned by storage managing module1 and a RAID4-like (N+1) protection scheme is applied, with 8+1 replicas in a row. The fact that the user-data of VD1 is stored in storage managing module1 does not necessarily mean that a storage consumer module 106, which tries to modify some of that data, has to communicate directly with storage managing module1.

In a RAID scheme, logic and data flow may be managed via a single module, that is used as a logic manager (or RAID manager) of the entire RAID stripe/VD-Row, for brevity referred to herein as a VD-Row Manager. The VD-Row manager is optionally the storage managing module 107 that owns (manages) user-data of that VD-Row. For example, storage managing module2 is a VD-Row manager and the storage consumer module 106 interact with the storage managing module2 that executes relevant logic to read from storage managing module1, XOR, and update the relevant physical segments of storage managing module1 and the relevant parity physical segments which may reside in storage managing module3.

The VD-Row manager may be a storage managing module 107 that does not own any physical segment of the respective VD-Row. The VD-Row manager optionally assumes a non distributed RAID scheme or a distributed logic RAID scheme.

Reference is now made to a description of the distribution of mapping information among storage consumer modules 106 and storage managing modules 107 and the metadata manager 108. In use, each storage consumer module 106 is provided with access to and/or copies of one or more of the following:

mapping of one or more volumes to which the storage consumer module 106 can access [Volume→Space] (i.e., the pertinent VAE array);

information about the domain's replicas, for example reference replicas; and mapping of VD-Rows relevant for the Volumes the storage consumer module 106 may access, for example [VD-Row→VD-Row Manager] entries for the entire domain.

When one of the storage consumer modules 106 handles a read/write command (I/O command), it goes from the block address of the volume to a relevant VD-Row, and from the VD-Row to a VD-Row manager that sends the I/O command to a deduced storage managing module 107. Optionally, the storage consumer module 106 specifies a VD ID and various offsets of the block to the storage managing module 107. The storage managing module 107 accesses to the VDs of the VD-Row and handles the respective I/O logic.

The storage managing module 107 stores mapping information that maps between each VD it manages and physical segments. Optionally, the storage managing module 107 pre allocates physical capacity according the current weight of each of the VDs it manages. The storage managing module 107 optionally maps the host storage modules 107 which manage the VDs of a certain VD-Row and handle the respective I/O logic.

Optionally, the metadata server 108 has and/or has access to some or all of the mapping information available to the storage consumer modules 106 and/or the storage managing modules 107. For example, the metadata server 108 has access to all the mapping information apart from physical segment management data. In such embodiment, the metadata server 108 maps VDs to storage managing modules 107 (i.e., which storage managing module 107 manages which VDs) and each of the storage managing modules 107 maintains mapping information about the physical segment it manages. Alternatively, the metadata server 108 maps VDs to drives 103 where the mapping assumes that physical segments of a VD reside inside a common single drive where the storage managing module 107 maintains the physical segments in the drive on his own.

Reference is now made to embodiments of the present invention that allow allocating dynamically responsibility to storage where allocation decisions are taken without updating the different consumer managing modules 106 and/or the different storage managing modules 107, without passing I/O commands via a central node, such as the metadata server 108. The process allows propagating updated mapping information reliably, consistently and efficiently while storage managing modules 107 and/or storage consumer modules 106 continue to interact with each other.

Optionally, in these embodiments, a single metadata server, such as 108, is defined to manage mapping of a domain in an authoritative manner so that mapping and/or ownership is determined by it. The metadata server 108 runs a mapping and/or rebalancing algorithm. Optionally, the metadata server 108 controls a freedom level of each storage managing module, for example decides which of its physical segments are allocated to which VD it manages.

Optionally, the metadata server 108 detects failures in storage managing modules 107, for example as described below. Optionally, the storage consumer modules 106 are not updated with the decisions of the metadata server 108 in real time so that the metadata server 108 is not dependant in any manner on the storage consumer module 106.

As at any given moment, a storage consumer module 106 may contain mapping information that is not up-to-date. Similarly, the storage consumer module 106 may receive to handle I/O commands which request access to data based on pertinent mappings which is not up-to-date. In order to avoid processing transactions which are not up-to-date from the storage consumer modules 106, the storage managing module 107 validates relevancy of each access request from the storage consumer modules 106. This allows the storage managing module 107 to reject I/O command pertaining to outdated data and/or to instruct the respective storage consumer module 106 to acquire up-to-date data from the metadata server 108, optionally for generating a new access request based on up-to-date data.

Figure 8:
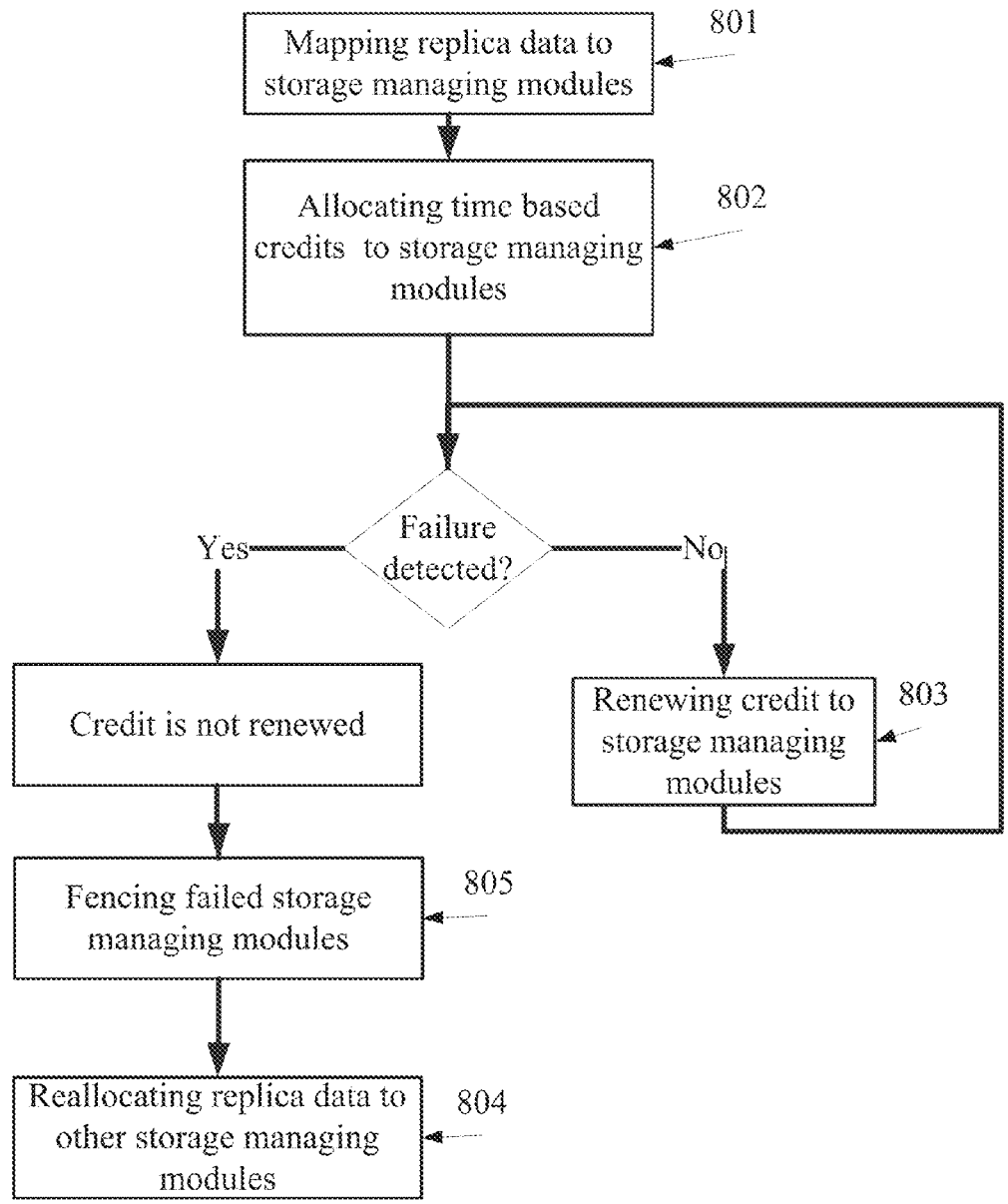
FIG. 8 is a flowchart of a method of validating data storage managing modules and/or data managed by data storage managing modules by iteratively renewing time-based credit, according to some embodiments of the present invention.

Reference is now made to FIG. 8, which is a flowchart of a method 800 of validating data storage managing modules and/or data managed by data storage managing modules by iteratively renewing time-based credit (TBC), according to some embodiments of the present invention. The method 800 allows storage applications 105 to use storage consumer modules 106 to perform I/O commands with the assistance of storage managing modules 107 without having up-to-date mapping information and/or up-to-date information indicative of currently failed storage managing modules.

First, as shown at 801, a plurality of replica sets are mapped to a plurality of storage managing modules installed in a plurality of computing units, for example between VDs and the storage managing modules. As described above, each storage managing module 107 manages access of one or more storage consumer applications 105 to one or more storage regions, such as the above described VDs.

As shown at 802, one or more time based credits are allocated to each of the storage managing modules 107, the replica data it stores, for example to a storage element, such as a VD and/or a drive.

Now, as shown at 803, the time based credits are iteratively renewed as long a respective failure of the storage managing module 107 and/or the replica is not detected. The time based credit is optionally given to a period which is longer than the renewal iteration rate. For example, ownership for one or more specific mapping elements may be given to a storage managing module 107 for a limited period. The time based credit and the renewal thereof is optionally managed by the metadata server 108 and/or any other central node.

Optionally, the renewal is initiated by the storage managing module 107, for example periodically and/or upon recovery and/or initialization. As long as no failures are detected, the metadata server 108 may renew the time based credit (early enough) so the storage managing module 107 does not experience periods of no-ownership.

Optionally, the renewal is initiated by the metadata server 108, for example periodically and/or upon recovery and/or initialization. As long as no failures are detected, the metadata server 108 may renew the time based credit (early enough) so the storage managing module 107 does not experience periods of no-ownership.

Optionally, as shown at 805, the metadata server 108 fences a storage managing module 107 which has been concluded as failed. As used herein, fencing refers to a declaration of a failing storage managing module 107 that is sent to storage managing modules 107. Optionally, the protocol forces the storage managing module 107 to conclude when it is fenced.

As shown at 804, when the time based credit is not renewed, after the fencing is performed, the replica data that is managed by the failed storage managing module is reallocated to one or more of the storage managing modules 107, for example by forward rebuild actions, for instance VDs which are managed by the failed and/or fenced storage managing module.

For example, when the metadata server 108 concludes that a certain storage managing module 107 fails to properly manage its mapping scheme or a portion thereof, for example when it is unresponsive, the metadata server 108 classifies this storage managing module 107 as a failed storage managing module. As described above, different storage managing modules 107 manage replica data in different VDs. When a certain storage managing module 107 manages primary replica data element, such as a net VD, that fails the metadata server 108 changes the status of a redundant replica data element, such as secondary VD, to a primary replica data element.

Optionally, if the time-based credit period of the failed storage managing module 107 is sufficiently shorter than I/O timeout clients, such as 111, a new storage managing module 107 is transparently mapped as an owner without letting any client suffer from I/O errors.

Optionally, the metadata server 108 performs a liveness check to determine which storage managing module 107 to fence. In such embodiments, the metadata server 108 pro-actively tests whether the storage managing module 107 is responsive or not. This allows pre-failure detection of a malfunctioning storage managing module 107. Optionally, the liveness check is performed when a storage managing module 107 is reported as failed by one or more storage consumer modules 106, optionally before it is being removed. Optionally, the liveness check is performed when the metadata server 108 fails to update the storage managing module, for example on a state change. Optionally, the liveness check is performed to continuously. Optionally, the liveness check is performed to storage managing modules 107 which are reported as unresponsive by one or more of the storage consumer modules 106.

Upon fencing, the storage managing module 107 stops serving requests, for example from storage consumer modules 106 or from other storage managing modules 107 which try to communicate with the fenced storage managing module.

According to some embodiments of the present invention, the metadata server 108 manages a current state of each of storage managing modules 107, optionally without cooperation from the storage managing modules 107. The current state may include, for example as described below, mapping and/or liveness data. In such embodiments, upon fencing, the metadata server 108 updates states freely without notifying the fenced storage managing module.

Optionally, mapping elements, such as scheme mapping which storage managing module manages which VDs are time tagged, for example with a generation numerator that indicates the relevancy of tagged element. Optionally, a generation numerator of a mapping element (indicative of storage location of data) is changed (e.g., increased) when the mapping element is changed. When a storage consumer module 106 communicates with a storage managing module 107, provides the generation numerator of the element upon which it decided to contact the storage managing module 107. If the storage managing module 107 has the same generation numerator associated with a pertinent mapping element, the storage managing module 107 owns, the information is consistent and the storage consumer module 106 are considered as up-to-date. Otherwise, storage managing module 107 concludes that the storage consumer module 106 is not up-to-date. In such a case (i.e., not-up-to-date generation numerator of the consumer module) the storage managing module 107 rejects requests, and, as a result, the requesting entity may request the metadata server 108 to provide him with a more up-to-date information re that mapping information (and/or any other more up-to-date mapping information the metadata manager may have).

When the metadata server 108 concludes that the storage managing module 107 is fenced, it updated its state, for example locally or in a remote mapping dataset. Optionally, new states are assigned with generation numerators which are different from the generation numerators known by the fenced storage managing module. One or more new storage managing modules 107 which manage the VDs of the failed storage managing module 107 are updated. Optionally, the metadata server 108 does not synchronize all the storage consumer modules 106 and other storage managing modules 107 regarding a fencing decision as the fenced storage managing module 107 rejects any new requests (or fails to respond when down).

According to some embodiments of the present invention, the fencing is performed passively, when a certain action is not performed. For example, the metadata server fences a storage managing module 107 if it does not receive a credit renewal request therefrom for a period which is longer than a waiting period. When such a protocol is applied, the metadata server can fence a storage managing module 107 by stop sending credit renewals and waiting until the time of the current credit passes. If, for that reason or another, storage managing module 107 wants to get fenced, it may achieve that by stop sending credit renewal requests.

According to some embodiments of the present invention, the fencing, when possible, is performed actively when the metadata server instructs storage managing modules 107 to become fenced and/or a storage managing module 107 notifies the metadata server 108, optionally spontaneously, that it is now in a fenced state. Active fencing is usually achieved faster than passive fencing.

Optionally, upon rejoining a storage managing module, its state is updated with a current state, for example by the metadata server 108 and/or by accessing a respective dataset. Upon re-joining the storage managing module, is synchronized so its state is updated with an up-to-date state, for example as described above. The synchronization is performed before the storage managing module 107 resumes serving incoming requests.

Optionally, the time based credit period is significantly smaller than the application timeout. For example, of a client timeout is about 30 seconds; an appropriate credit period may be about 5 seconds.

Figure 9:
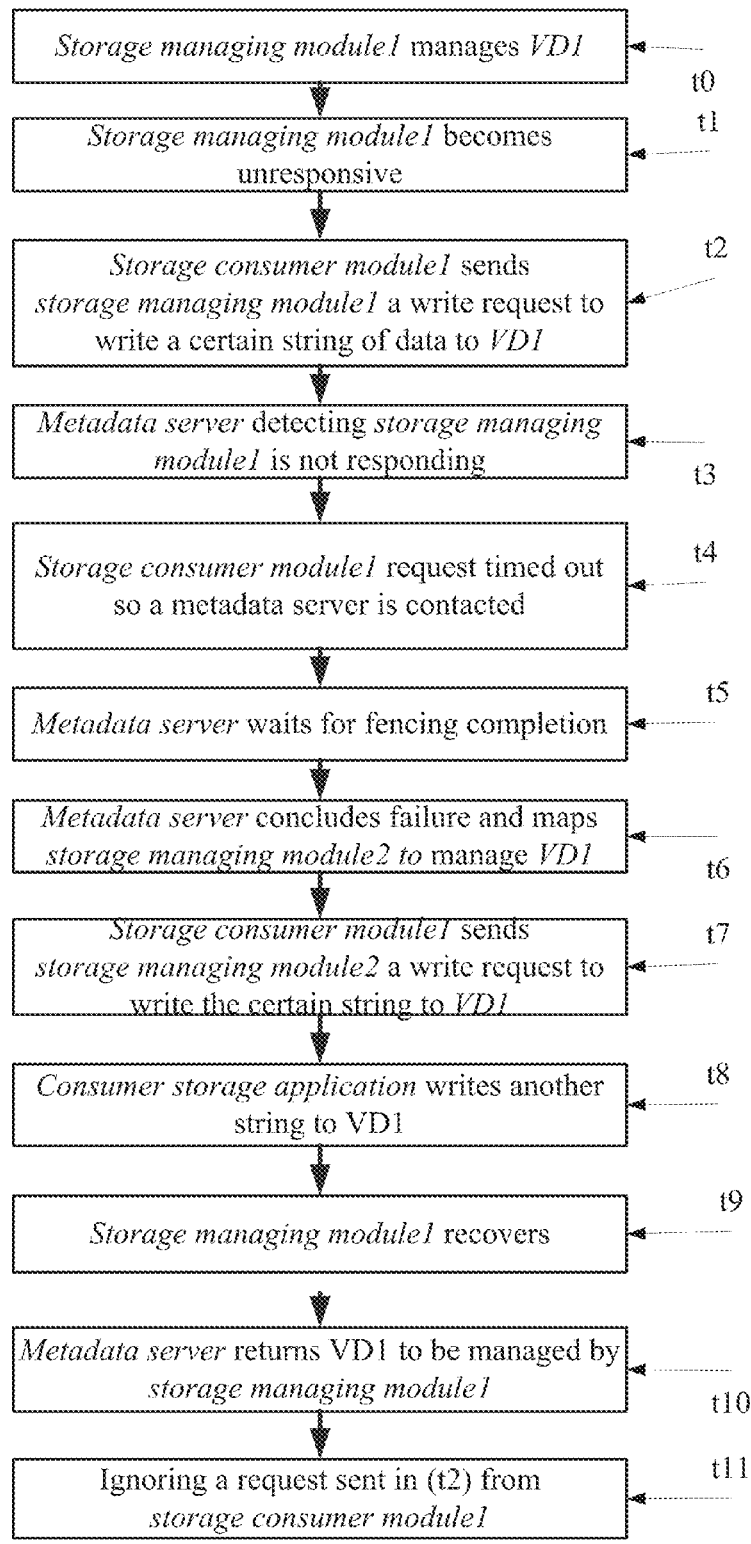
FIG. 9 is a flowchart depicting exemplary I/O flows in the system where a RAID1 (two copies) scheme is used, according to some embodiments of the present invention.

Optionally, in order to avoid ghost writing race conditions, which may occur under various lower layer semantics of the interconnect protocols, the generation numerator of the state is changed. For example, reference is made to FIG. 9 which is a flowchart depicting exemplary I/O flows in the system 100 where a RAID1 (two copies) scheme is used, according to some embodiments of the present invention. Optionally a VD-Row manager is hosted in the storage managing module 107 that manages (owns) the managed VD:

First, at (t0), storage managing module1 manages a net VD1. The generation numerator of the VD is equals 500. Then, at (t1) storage managing module1 becomes temporarily unresponsive to I/O commands while remaining alive. Now, at (t2) storage consumer module1 sends a write I/O (CMD1) to storage managing module1 (for example writing a certain string in a segment of VD1). The CMD1 arrives at storage managing module1 but halts very early in its processing chain because of malfunction (e.g. hiccup). Now, at (t3), the metadata server performs a live-check and detects that storage managing module1 is not responding, and starts a fencing process, for example waiting for the end of the time-based credit. In (t4) storage consumer module1 timesout and hence contacts metadata server to determine what to do next (i.e. sending REQ2). At (t5), the metadata server holds REQ2, optionally until fencing is completed. Now, when the fencing is completed at (t6), the metadata server concludes that storage managing module1 no longer holds a valid credit for VD1. Therefore, the metadata server cuts a decision and remaps VD1 to storage managing module2 with generation numerator 501 and notifies storage managing module2 which is the secondary of storage managing module1 for this VD. Then, metadata server responds REQ2, letting storage consumer module1 know that the new storage managing module 107 to contact is storage managing module2. Now, at (t7), the storage consumer module1 re-sends the I/O command to storage managing module2 (CMD3). storage managing module2 writes the certain string and returns to storage consumer module1 that respond with an acknowledgment to the consumer storage application. At (t8), the storage consumer application writes another string to the same address in VD1. This time, storage managing module2 writes the other string and the write I/O completes. The application may now safely assume the content of that area is a copy of the other string. At (t9), storage managing module1 recovers, at least partially, and re-joins the domain. It synchronizes its state and deduces that it is no longer the owner of VD1. Note that in this scenario, CMD1 may be in a halt state inside storage managing module1, for example, inside an incoming transmission control protocol internet protocol (TCP/IP) socket of the connection between storage consumer module1 and storage managing module1. At (t10), the metadata server determines to return the management (ownership) of VD1 to storage managing module1. Some user-data re-build is done in VD1, for example, the other string is copied to storage managing module1, and optionally and similarly to standard RAID 1 backwards re-build. Note that until storage managing module1 is activated, CMD1 remains in a halt state. Now, roles may be reversed, and storage managing module1 gains management (ownership) of VD1 with generation numerator 502. At (t11) CMD1 is processed by storage managing module1. Since CMD1 arrived with generation numerator 500, storage managing module1 rejects CMD1. This allows avoiding undesired write of data (the certain string would be written to VD1 thus creating data corruption as the correct data should be the other string).

According to some embodiments of the present invention, the metadata server 108 and the storage managing modules 107 use unsynchronized clocks to implement a TBC based validation, for example using built-in clocks with a reasonably bounded drift, for example of less than 10 mSec every 1 second. The process may be held between the metadata server 108 and each of some or all of the storage managing modules 107.

In use, the metadata server 108 allocates, to each one of the storage managing modules 107, TBC for each one of the mapping elements it manages. For example, the TBC of about 5 seconds or higher, may be given at a rate of about every 1 second. Optionally, a single credit is assigned per storage managing module 107 and set to affect all the storage managing module 107 ownerships. Alternatively, multiple credits may be managed, each for a different set of ownerships (i.e., finer granularity). Such a modification may be apparent to those who are skilled in the art.

In an exemplary process, the storage managing module 107 samples a local clock (t0) and sends a credit-request message to the metadata server every time unit, for example 1 second. In response, the metadata server receives the message, samples its local clock (tt0), and sends a credit-response to the storage managing module, for example allocates a period, such as 5 seconds. Note that no absolute timestamps are used as there is no clock-synchronization between the two. The storage managing module 107 receives the time based credit-response message and renews its credits until t0+5 seconds, optionally minus a minimal drift, for instance minus 50 mSec which is the given credit period (i.e. 5 seconds) multiplied by a maximal drift (i.e. 10 mSec per second). After the time based credit expires (i.e., t0+5 seconds–50 mSec as described above), the storage managing module 107 may conclude that it is fenced. If the metadata concludes fencing, for instance at $t_{r0}$+5 seconds, no further credit is given.

Note that the interconnect roundtrip of the time based credit-request/response is not used by the mechanism. A theoretical optimization could allow storage managing module 107 to safely renew its credits to an even longer period than 5 second taking a roundtrip into consideration.

Optionally, the above protocol is modified such that it is originated by the metadata server. For example, an initial message may be sent from the metadata server to a storage managing module 107 before the above protocol is executed.

According to some embodiments of the present invention, the TBC is based on a common clock and/or synchronized clocks. In these embodiments, after the metadata server 108 and the storage managing modules 107 clocks are synchronized, the metadata server periodically, for example every 1 second, sends a credit renewal message with a timestamp to each storage managing module 107 and the storage managing module 107 renews its credit accordingly. Optionally, only one message is required without request/response handshakings. As this protocol is unidirectional, a liveness check protocol may be implemented between the metadata server and some or all of the storage managing modules 107.

Reference is now made to a process of mapping content to storage managing modules 107. The following define records which may be locally stored and/or directly accessed by each storage managing module 107:

1. A VD data ownership record—a record that defines which VDs are managed by the storage managing module. Optionally, information about other storage managing modules 107 in that VD-Row is also stored. The record may include a parity VD pertaining to VDs of the VD-Row.
2. A VD-Row ownership record: a record which the storage managing module 107 that functions as a VD-Row manager manages. Optionally, the VD-Row manager also owns data for one of the VDs in the VD-Row, parity data, and/or transformation data.
3. Volume information record: a record pertaining to volumes covered by an owned VD. The information may be granular, for example mapping fragments to volume entries or less granular (a list of relevant volumes). Note that usage of this information is demonstrated later in this document.
4. Consumer mapping record: a record which maps volume(s) to storage consumer module(s), for example for authorizing access to a volume based on the identity of the storage consumer module.
5. Physical segment mapping record: a record that maps physical segments in the managed drives and may be remotely managed by the metadata server.

Optionally, the records are expired upon TBC expiration. Optionally, any of the above TBC validation and/or fencing processes may be used to allow the metadata server to reliably control and/or conclude the expiration of these records even without an explicit communication with the storage managing module. As already discussed, once storage managing module 107 is fenced, the metadata server performs ownership changes for any of the above mapping elements, optionally without the cooperation of the storage managing module.

Optionally, only the metadata server 108 has privileges to change the state of a storage managing module 107 from a fenced state. Once the metadata server communicates with the storage managing module 107 and decides it wants to unfenced the storage managing module, a mapping element synchronization protocol is implemented to allow the storage managing module 107 to update its mapping elements according to the changes happened while he was fenced.

Reference is now made to methods and systems of balancing and maintaining replica sets and/or replicas, according to some embodiments of the present invention. The balancing may be performed by maintaining various domain mappings, for example by replica creation and/or removal, volume creation and/or removal, VD to storage managing module 107 mapping and/or the like. The balancing may be executed by mapping decisions. Optionally, the balancing is performed according to mapping constraints, which are defined to balance the storage space. Optionally, some or all of the constraints are loosely defined so it sufficient to get close to a certain value in order to get a balanced storage.

Optionally, during the period between the taking of a mapping change decision and the execution thereof, for example while VD data is copied from one storage managing module 107 to another, events that cause additional mapping decisions may occur. In order to avoid waiting for the copying to complete, a number of methods may be used.

According to some embodiments of the present invention, some data migrations are scheduled or rescheduled (throttled) to control the rate in which data migrations are processed. As used herein data migrations includes rebalancing and/or forward rebuild operations. For example, the maximum number of data-migration operations which are performed concurrently by the same storage managing module is set. For brevity, an active data-migration may be a current data-migration of a specific VD between storage managing modules 107 and a pending data-migration is a planned uninitiated data-migration of a specific VD between storage managing modules 107.

The throttling allows avoiding having a large number of VD data-migrations per storage managing module 107 that results in a slower progress for all active data-migrations. By limiting the concurrent number of data migrations threshing is avoided. Moreover, if an event that forces a balancing process to re-evaluate the balancing, most of the VD data-migrations may be canceled without substantial penalty.

Optionally, the number of concurrent data migration operations is a controlled parameter.

Some data-migrations may be more urgent than others. Optionally, the system supports a shutdown preparation wherein a storage managing module 107 is prepared to shutdown. The shutdown preparation may be triggered automatically or manually upon request. In this process, VDs which are associated with the storage managing module 107 are migrated to other storage managing modules 107. Data-migrations may be prioritized according to its type. For example, data-migration pertaining to shutdown may have a higher priority than general data-migration for rebalancing that takes place, for example, when a new capacity is added. Optionally, forward-rebuild actions, wherein data is migrated because of failure may have a higher priority than other data-migrations. Optionally, an operator may have dynamic control over the priorities of the various data-migrations.

Optionally, a spare capacity policy is managed by the system 100. For brevity, as used herein, capacity denotes storage of drive(s), which is used to hold the data of the domain's volumes. The capacity is measured in bytes, for example gigabytes (GBs) and/or terabytes (TBs). Optionally, the capacity in physical segments is measured and/or managed per storage managing module 107. Optionally, for brevity, spare capacity means current unused capacity in the entire domain. Maintaining spare capacity is important for various reasons, for example providing storage that may be instantly allocated for hosting data received in a forward-rebuild action, for example upon a storage managing module 107 failure.

Optionally, once the domain is fully balanced, the unused capacity is substantially proportionally balanced across the storage managing modules 107. As used herein, substantially proportionally means that the percentage of unused physical segments is similar, for example with no more than about 10% deviation, in each one of the storage managing modules 107. Optionally, a minimum absolute amount of spare capacity per storage managing module 107 may be defined.

Reference is now made to an example of spare capacity maintenance policy. A spare capacity threshold, which is optionally a configurable parameter, is defined, for example 10%. The metadata server attempts to maintain the spare capacity>10% at all storage managing modules 107. For example, when the metadata receives a request to create a volume that results in having a smaller than 10% spare capacity, it rejects the request. Similarly when, a request to remove a storage managing module 107 and/or to adjust drive capacity to have less than 10% spare capacity, the request is rejected. Optionally, when a storage managing module 107 fails or a drive fails, the spare capacity is used for forward-rebuild even if it results in having less than 10% of spare capacity.

Optionally, a forward-rebuild operation is performed before a rebalancing operation. In such embodiments, until the forward-rebuild operation is completed, the VD's protection is degraded and/or until a data-copy for rebalancing completes, the domain is considered as unbalanced.

Optionally, the capacity of an storage managing module 107 is categorized so that at any given time, an storage managing module 107 has a record indicative of the of physical segments, the amount of unused physical segments and the amount of used physical segments.

Additionally or alternatively, the capacity of a storage managing module 107 is categorized so that a total of Y physical segments is divided into L resting physical segments M moving in physical segments and N moving-out physical segments so that Y=L+M+N. Optionally, a moving-in physical segment is part of a VD that is currently data-migrated into the storage managing module 107 and referred to herein as an active moving-in physical segment or is planned to be data-migrated into the storage managing module 107 herein as a pending moving-in. The definition for moving-out, active moving-out and pending moving-out are similar.

The above embodiments may be implemented using counters (i.e. for Y, L, M, and N) per storage managing module. The counters may be managed by the metadata server 108. A different approach could be to maintain information per specific storage managing module 107 physical segment, and then to deduce the accounting information from the per physical segment information.

As described above, it is important to emphasize that while the accounting above is done in a physical segment granularity, the data-migration decisions may be taken on complete VDs whose weight may be between 1/N and N/N. In this manner, a single data-migration decision for a 15/64-weight VD, from storage managing module1 to storage managing module2 results in turning 15 physical segments of storage managing module1 into a pending moving-out state, and 15 corresponding physical segments of storage managing module2 into a pending moving-in state. Once the data-migration becomes active for that VD, all the 15 physical segments become active moving-in (active move-out).

Optionally, the metadata server 108 manages a storage managing module capacity record per storage managing module 107. Optionally, the storage managing module capacity record maintains information about the drive capacity of the different storage managing modules 107 and keeps accounting information pertaining to the usage of that capacity. The capacity is optionally measured in a physical segment granularity. Optionally, the storage managing module capacity record allows determining how many physical segments are:

free;

at-rest (e.g. remove-pending and non remove-pending as described below);

pending moving-in;

active moving in;

pending moving-out (e.g. remove-pending and non remove-pending as described below); and active moving-out (e.g. remove-pending and non remove-pending as described below).

The storage managing module capacity record is continuously updated according to updates of physical segments, for example in any of the following events:

adding a storage managing module 107 to a domain;

taking a decision for a VD data-migration from one storage managing module to another (the data-migration becomes pending);

turning a pending data-migration into an active data-migration;

a completion of a data-migration;

a cancellation of data-migration;

a data migration failure;

an allocation of a capacity is allocated for a new VAE;

a storage managing module is requested to be removed and/or shutdown; and a drive is added to (or removed from) an existing storage managing module.

Optionally, once a decision to remove a storage managing module 107 is made, the system 100 migrates the VDs associated with that storage managing module 107 to other storage managing modules 107. From the moment the storage managing module 107 is requested to be removed, physical segments in that storage managing module 107 are identified. Now a remove-pending storage managing module 107 property in the storage managing module capacity record is set to indicate that the storage managing module 107 is about to be removed. Generally, any free or moving-out physical segments of a remove-pending storage managing module 107 should not be used by the algorithms as available or to-be-available capacity.

For global, domain-level capacity accounting, it may be useful to ignore all the physical segments of a remove-pending storage managing module, although other variations (for example, accounting its physical segments but free) may also be a legitimate variation.

The storage managing module capacity records are optionally stored in a dataset, referred to herein as a capacity directory. The dataset is optionally managed by the metadata server. Optionally, the capacity directory further includes aggregated capacity accounting information, for example the amount of total free capacity. Optionally, the information in the capacity directory is organized such that various data-access and/or searches described in the algorithms below are efficient.

Optionally, the system 100, for example the metadata server 108, manages a replica directory organizes a set of data-structures with information about replicas in the domain, their VDs and their VAEs. The replica directory allows data access and/or search for example as described below. Optionally, each replica or replica set is represented by a structure. For example, a replica Structure represents a replica and contains and/or points to respective VDs and its VAEs and a replica set structure represents a replica set and contains and/or points to respective replicas. Optionally, each replica set structure is weighted, for example contains a weight property which holds the VD weight value of all the replica set's VDs. Optionally, as described above, all the VDs in a VD row have the same weight.

Optionally, each VD is represented by a VD structure. The data structures allow deducing the VD-Row members, the replica of the VD, and the weight of the VD. The VD structure optionally contains the storage managing module 107 this VD is currently assigned to. In use, under data-migration, in a period wherein two storage managing modules 107 are assigned to the same VD (the current and the new one), the two storage managing modules 107 are registered at the VD structure.

Optionally, the VD structure contains a field indicating whether the respective VD got into a state wherein it needs an assignment for a new storage managing module 107 (as the existing storage managing module 107 failed, or some of its physical capacity is malfunctioning). In other words, on a failure that requires a VD-Row to perform a forward rebuild operation, the pertinent VD that needs a new storage managing module assignment changes its state and a relevant storage managing module 107 is assigned, optionally in a balanced manner.

Optionally, each VAE is represented by a VAE structure that allows deducing data of which replica the VAE is associated with, and optionally the data offset in the replica. Optionally, a VAE free-list of VAEs is maintained to indicate which VAE is currently used and/or not used by a respective volume. Optionally, a policy for allocating a VAE is defined, for example by maintaining and using a first in first out and/or last in first out queue and/or list. Whenever a new VAE is created, for example VAEs of a replica, or whenever a volume is removed (or shrunk), the respective VAEs are added to the list. Whenever a volume is created (or enlarged), VAEs are allocated and hence removed from the VAE free-list. Optionally, VAEs may be allocated from the replica according to weights, for example from the largest weight to the smallest. In this manner, when a domain shrinks in capacity and yet volumes are created and removed from time to time, chances for removal of replica are greater.

Optionally, a volume VAE structure, for example array, that contains the VAEs of the volume is maintained in a manner that allows an efficient volume address to VAE resolution.

Reference is now made to one or more mapping algorithms. Optionally, a RAID 1 (2-copy or 3-copy RAID1) is implemented; however any scheme such as RAID N+1 require modifications which are apparent for those who are skilled in the art, including RAID 6.

Optionally, in the assumed scheme, each origin VAE (net VAE) is associated with one (in 2-copy RAID1) or two (in 3-copy RAID1) redundant VAEs. In these embodiments handling of a VAE is made by handling a VAE Row. Note that algorithms are described as if they are executed in an atomic fashion.

Figure 10:
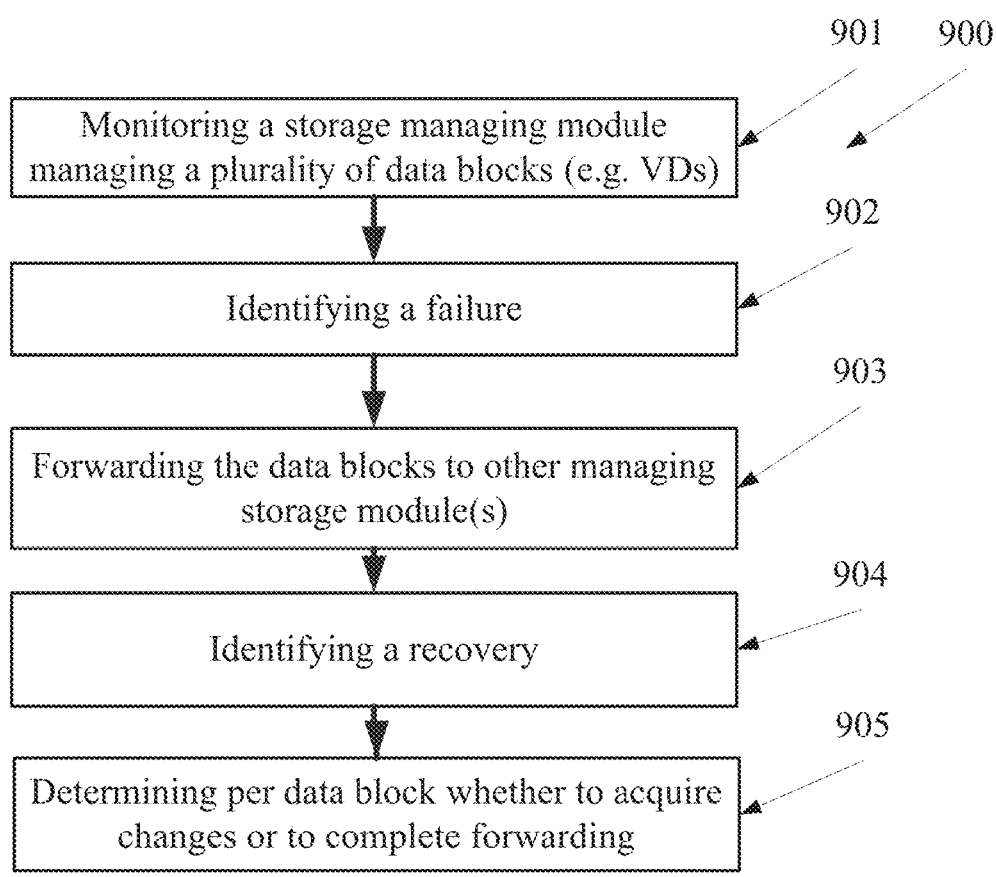
FIG. 10 is a flowchart 900 of a method of managing a data rebuild operation, according to some embodiments of the present invention.

Reference is now made to FIG. 10, which is a flowchart 900 of a method of managing a data-migration operation, for example a data rebuild operation, according to some embodiments of the present invention. First, as shown at 901, any of the storage managing modules 107 manages access of some or all of the plurality of storage consumer applications 105 to data blocks of data stored in one or more of the drives 103 it manages, for example as described above, for instance access to VDs which store replica data. As shown at 902, the metadata server 108 identifies a failure of the storage managing module and/or the respective drive(s). The identification may be performed by a liveness check and/or a report from the storage managing module 107 itself and/or a storage consumer module, as described above.

After the identification, as shown at 903, a rebuild operation of the data is initiated by forwarding, for instance using forward rebuild operations, the data blocks, for example the VDs, to be managed by one or more other of the storage managing modules 107 in response to the failure. Optionally, a forward rebuild operation includes copying replica VDs of the VDs of the failed storage managing module 107 to the one or more other of the storage managing modules 107. These replica VDs are managed by a group of operating storage managing modules 107 of the system 100. Optionally, each member of the group manages a log indicating which changes has been performed in the replica VD(s) it manages during the forward rebuild operation. This log may be used for identifying changes to the respective replica VD, for example as described below.

Now, as shown at 904, during the rebuild operation, a recovery of the first storage managing module and/or the failed drives is identified by the metadata server 108.

As shown at 905, the metadata server 108 determines per each of the data blocks which have not been completely forwarded to another storage managing module 107, for example per VD, whether it should be forwarded to other storage managing module(s) or whether changes thereto, made during the failure period, should be acquired to restore the data block, for example in an operation referred to as backward rebuild. Optionally, the changes to each VD are identified by reviewing a respective log managed by the operating storage managing module 107 which manages a respective replica VD.

Reference is now made to exemplary implementations of some operations made in embodiments of the present invention. First, reference is made to an updating of properties of certain storage managing modules 107 when a pending data-migration is converted to an active data-migration (e.g., by a throttler). The properties of each of the certain storage managing modules 107, for example from the storage managing module capacity record thereof, denoted herein as Storage managing moduleCap, and optionally properties of the VD are updated, for example see the following pseudo code:

```
//Data-migration of VD vd from storage managing module1 to
storage managing module2 pending to active
    Update the various accounting properties of the Storage managing
moduleCap structures of storage managing module1 and storage
managing module2:
```

```
        -Storage managing moduleCap[storage managing module1]
        -moving_out_pending -= weight[vd]
        -moving_out_active += weight[vd]
        -Storage managing moduleCap[storage managing module2[ ]
        -moving_in_pending -= weight[vd]
        -moving_in_active += weight[vd]
    Modify the VD (and/or VD-Row) structure to indicate that the
VD is now in active data-migration.
```

Reference is now made to exemplary implementations of mapping activities done when an active data-migration completes successfully:

```
    //Data-migration of VD from storage managing module1 to
storage managing module2 completes successfully
        Update the various accounting properties of the Storage
managing moduleCap structures of storage managing module1 and
storage managing module2:
        -Storage managing moduleCap[storage managing module1]:
        -moving_out_active -= weight[vd]
        -unused += weight[vd]
        )if storage managing module1 is remove-pending, unused
capacity is maintained as 0)
        -Storage managing moduleCap[storage managing module2]:
        -moving_in_active -= weight[vd]
        -at_rest += weight[vd]
    Modify the VD (and/or VD-Row) structure to indicate that the
VD is now at rest. In addition, remove its assignment with storage
managing module1.
```

Similar actions may be performed to cancel a data-migration.

Reference is now made to mapping activities made in response to a failure of data-migration of VD vd from storage managing module1 to storage managing module2 (assignment abortion):

```
    // to storage managing module2.
        Update the various accounting properties of the
Storage managing moduleCap structures of storage managing module1
and storage managing module2:
        - Storage managing moduleCap[storage managing module1]:
        - moving_out_active -= weight[vd]
        - at_rest += weight[vd]
        - Storage managing moduleCap[storage managing module2]:
        - moving_in_active -= weight[vd]
        - unused += weight[vd]
        (if storage managing module2 is remove-pending, unused
capacity is maintained as 0)
    Modify the VD (and/or VD-Row) structure to indicate that the
VD is now at rest. If the type of data-migration was a forward-rebuild
or a preparation for STORAGE MANAGING MODULE 107 shutdown,
the VD should be marked as requesting a data-migration.
```

Similar actions are performed whenever a data-migration is cancelled.

According to some embodiments of the present invention the storage elements are set according to one or more constraints. For example, the following constraints may be applied:

the number of VAEs per replica, for example, if a replica contains 64 VAEs, the weight of replica may be any number between 0 a maximum number of VAES;

the size of the VAE (e.g., 8 GB); and the number of VDs per replica.

Optionally, replica sets are of the same structure and hence have the same constraints. Alternatively, replica sets are of different structure and hence have different constraints.

Reference is now made to exemplary implementation of a volume creation process. The mapping activities are done as part of a volume creation request. Generally, allocation of the volume is performed by allocating the VAEs required for the volume. First, it is verified that the amount of free capacity is above a required spare capacity threshold. Then, unused VAEs of the existing replica set(s) are allocated for storage. If there are no sufficient VAEs, the residual VAEs are allocated by creating replica set(s). Once a replica set is created, the mapping of VDs to storage managing module 107 assignments is arranged, optionally in a balanced manner as described below. Note that, in addition, whenever a set of VAEs, which are all the copies of a certain VAE from all the replicas of a replica set and/or the corresponding VAEs from all the replicas of a replica set, referred to herein as a VAE row, is allocated, the weight of the corresponding replica set is incremented by 1/a maximum number of VAES constraint, see for example the following implementation:

It should be noted that in the calculation presented in 02, moving-out physical segments are not counted as free space. Alternatively moving-out physical segments may be counted as free space.

```
// AllocateVAERow procedure: allocates an VAE-row from an existing VRG and
// if no free VAE-rows are available then allocate a new VRG and allocate
// an VAE from that VRG. Update capacity directory accordingly.
01. If VAE-row free-list is empty
{//Need to create a new VRG, assign Storage managing modules 107 to its VDs, and allocate one of
// its VAEs
02. create a new VRG with VR0Gs of initial weight 0 (this includes all the
corresponding data structures - e.g., VD structures, with fields initialized
to the relevant values)
03. alloc capacity (from the capacity directory) for N_VD*2 VDs (in 2-copy
RAID1, or N_VD*3 for 3C RAID1) of weight 1/MXW (this should be done in a
fully balanced manner from all Storage managing modules 107). Update the
Storage managing moduleCap structure accounting properties accordingly
04. If failed (i.e., if at least one STORAGE MANAGING MODULE 107 doesn't have
enough free Physical segments)
05. {rollback and end the procedure with a failed status}
06. assign the Storage managing modules 107/capacity in the various VRG's VD cells//
Do it while maintaining the RAID constraint and balanced storage
constraints (see the following pseudo code)
07. } else {
08. alloc an VAE (VAE-row) from the VAE free-list
09. alloc capacity (from the capacity directory) from the Storage managing
moduleCaps associated with
the VRG's VDs - we add 1/MXW weight for each such VD. Update the Storage
managing moduleCap
structure accounting properties accordingly.
10. If failed (i.e., if at least one STORAGE MANAGING MODULE 107 doesn't
have enough free Physical segments)
11. {rollback and end the procedure with a failed status }}
12. Increment the VAE's VRG weight
Notes
```

As used herein, allocation in a fully balanced manner, as presented in 03, means that the allocation is proportional to the capacity of each storage managing module. It is assumed that all storage managing modules 107 have the same capacity. It is typically impossible to allocate exactly the same number of physical segments from each storage managing module. For example, a closest to a balanced allocation of 1,024 physical segments from 100 storage managing modules 107 requires 10 physical segments from 76 storage managing modules 107 and 11 physical segments from the residual 24 storage managing modules 107. Optionally, a monitoring process assures that the allocation process does not bias the same storage managing modules 107 each time. Optionally, the number of VDs per replica should be higher than the number of storage managing modules 107 in the domain.

It should be noted, with reference to 09, that if such a VD is currently participating in a data-migration (either pending or active), for example if the VD is associated with 2 storage managing modules 107, then the additional capacity allocation should be performed on both of the storage managing modules 107. The storage managing module capacity record, for example the Storage managing moduleCap is updated accordingly. For example in the destination storage managing module, a moving in (pending or active) counter should be incremented while in the source storage managing module, a moving out (pending or active) counter is the one to be incremented.

Optionally, new physical segments in the drives, which are managed by a certain storage managing module 107, are allocated by the certain storage managing module who manages these drives.

```
// Create Volume mv1 of size vol_size
Calculate how many VAE rows need to be created
(num_of_VAE_rows) (internally we view the size of the volume
as VAE_size * num_of_VAE_rows, which may be larger than
the requested vol_size). So, for example, if the VAE_SIZE is 8GB
and the request is for a 15GB volume, we internally need to allocate 2
VAEs, thus having a volume whose "internal" size is 16GB. For
any internal purpose, the volume size is 16GB. Any application
requests to an area which is outside of the "external" volume
size (15GB) will be rejected though.)
02. Verify (in the capacity directory) that when allocating the
new capacity needed, the free capacity won't become lower than
the spare threshold. If not enough spares, reject the request.
03. Loop num_of_VAE_rows times:
{04. call AllocateVAERow procedure (described below)
05. if allocation failed then rollback and end by rejecting the
request
06. add the VAE to mv1's VAE array}
```

It should be noted, with reference to 06, that the assignment algorithm assumes 2-copy RAID1, may be transformed to a 3-copy RAID1, for example as follows (where N_VD is indicative of a number of VDs in a replica):

```
// To begin with, we have an array of 2*N_VD STORAGE MANAGING
MODULE 107 Physical segments (each containing the
// STORAGE MANAGING MODULE 107 ID to be used) and an array of N_VD
VD-Rows, where each containing 2
// cells - one for each VD's STORAGE MANAGING MODULE 107 assignment.
The goal is to arrange the
// Physical segments in a way that maintains the RAID constraint and balanced
storage constraints
00. N_PHSEG = 2*N_VD // the number of the allocated Physical segments
01. Random Shuffle the Physical segment array (use any known algorithm)
02. Assign the (2 × N_VD) VD cells with the Storage managing modules 107 of
the Physical segment array by
a simple array [N_PHSEG × 1]→[N_VD × 2] copy.
03. Loop index=0 .. (N_VD−1):
{ // If RAID constraint is not met (i.e, the two VDs of the VD-Row
// point to the same STORAGE MANAGING MODULE), then randomly find a
(different) row
// that any of its cells do not contain our row's STORAGE MANAGING
MODULE. Then toggle
// the value of one of the cells of our row with one of the cells
// of the randomly found row.
04. if (VdStorage managing module[index,0]==VdStorage managing
module[index,1])
{ resolved = false
05. While (resolved==false)
{06. index2 = random(0..(N_VD−1), excluding index)
07. if ((VdStorage managing module[index,1] != VdStorage managing
module[index2,0]) AND
(VdStorage managing module[index,1] != VdStorage managing
module[index2,1])
{08. switch values (VdStorage managing module[index,1],VdStorage managing
module[index2,1])
09. resolved = true}}}}
10. End
```

Reference is now made to implantation of mapping activities done when a new storage managing module 107 with a drive capacity is added to the domain. This implantation holds both for a very-new storage managing module 107 and for storage managing modules 107 that were orderly shutdown (and hence were completely and orderly removed from the domain):

```
// Add STORAGE MANAGING MODULE 107 storage managing
module 107 with Capacity cap
01. Cancel all the pending data-migration (and update Storage managing
moduleCap & VD structures accordingly)
02. Add an Storage managing moduleCap for storage managing module,
set its capacity and unused capacity to cap (the rest of the accounting
fields are set to 0)
03. End
```

Once the above process ends, the system is in an unbalanced state. Optionally, a rebalancing module is used to detect the unbalanced state and to initiate rebalancing activities.

It should be noted, with reference to 01, the meaning of "cancelling a pending data-migration from storage managing module1 to storage managing module2 is that the assignment to storage managing module2 is wiped (the VD remains assigned to storage managing module1). The Storage managing moduleCap structures of both storage managing module1 and storage managing module2 are updated accordingly. It should be noted that canceling the pending data-migrations is optional. Furthermore, one may even decide to cancel active data-migrations. In addition, cancelling only some of the pending data-migrations (e.g., all non forward-rebuilds) is a legitimate variation.

Optionally, a storage managing module 107 is removed from a domain (i.e. for temporal shutdown and/or removal from the domain) is performed by data-migrations which are initiated in order to remove all ownerships of the about-to-be-removed storage managing module. The removal completes only after all those data-migrations complete.

Additionally or alternatively, a storage managing module 107 is removed instantly by emulating a storage managing module 107 failure. This may cause a penalty in the form of a RAID protection exposure during a forward-rebuild period. Optionally, the user may turn the orderly removal into a quick unorderly removal, for example by a manual selection and/or definition. The following describes the actions for the above use-cases:

```
// Orderly/Unorderly removal of STORAGE MANAGING MODULE
107 storage managing module
01. Verify (in the capacity directory) that when removing storage
managing module' capacity, the resulting free capacity won't
become lower than the spare threshold. If not enough spares, reject
the request.
02. Set storage managing module 107 as remove-
pending
03. Cancel all data-migrations (active & pending) that go into storage
managing module 107 (and update Storage managing moduleCap
& VD structures accordingly)
04. Cancel all the pending data-migration (and update Storage managing
moduleCap & VD structures accordingly)
05. Set storage managing module 107 Storage managing moduleCap
unused counter as 0
06. Loop on all VDs assigned to storage managing module:
{07. mark the VD as requesting a data-migration (STORAGE
MANAGING MODULE 107 removal priority) }
08. End - one should asynchronously wait until all Physical segments
of Storage managing moduleCap "disappear" and then
Removal can be completed by removing the Storage managing
moduleCap.
Notes
```

As scripted in Line 01, this exemplary process supports several levels of storage managing module 107 removal capacity-left verification. In such embodiments, optionally, instead of validating spare capacity, it is verified that the storage managing module 107 removal does not result in compromising a protection level as insufficient capacity remains.

As scripted in Line 03 and 04 and previously mentioned, data-migration cancellations may be done for achieving overall efficiency.

As scripted in Line 05, unused physical segments are ignored by setting a pertinent Storage managing moduleCap counter as 0.

Once the process ends, a rebalancing module may initiate data-migrations which eventually cause the storage managing module 107 removals to complete. Optionally, the removal of a storage managing module 107 includes a process of copying the VDs it manages to drives which are managed by other storage managing modules 107. In order to avoid a bottle neck, replicas of the VDs it manages may be copied in the process instead of the VDs that it manages. In such a manner, different VDs may be copied from different drives managed by different storage managing modules 107 simultaneously, facilitating avoiding a bottle neck and/or reducing copying time and/or distributing required computational efforts.

A physical segment removal may not be completed, for example when during an orderly removal process some failures happened and hence there is insufficient capacity for completing the removal and/or sufficient spares according to a spare capacity policy. In such events, the removal continuation may be disallowed if it results in a low spare capacity. Another possibility is to disallow a removal continuation when an out of space prevents the completion thereof. Optionally, the disallowing process is selected by a user.

It should be noted that the mapping activities which result from a storage managing module 107 failure are similar to the mapping activities of orderly and/or quick storage managing module 107 removal; however, in these mapping activities a number of differences are found:

a. Initial capacity-left verification may not be performed.

b. When a forward-rebuild for a VD is in progress, the failed storage managing module 107 may come back alive. In such a case one may either decide to continue the forward-rebuild or to perform backwards-rebuild, if the backwards rebuild may be done quicker that the residual of the forward-rebuild. Such decision could be taken on a per-VD basis. Hereafter this action may be referred to as RAID regret.

c. A waiting period between storage managing module 107 failure event and actual initiation of forward rebuild operation may be implemented, giving the failed storage managing module 107 a chance to recover.

d. When two storage managing modules 107 fail, the states of one or more VDs change to a no data service state.

Reference is now made to actions taken when a failed storage managing module 107 returns recovers. When a storage managing module 107 recovers but one or more of its drives no longer contain the data they contained just before it failed, then this act is equivalent to adding capacity to a storage managing module, for example as described above. It may be possible that a storage managing module 107 recovers where some of its physical segments are undamaged (i.e., contain the data just before the failure) and some are damaged (e.g., one of the physical disks out of several is gone).

Optionally, a recovering storage managing module 107 is viewed as a new storage managing module. Note that if that's the case, one may implement an optimization such that VDs which were not written to since the storage managing module 107 failure may not require a forward rebuild (i.e. the original storage managing module 107 assignment to storage managing module1 may be used and the data-migration may be canceled).

Optionally, after the storage managing module 107 recovers, the handling for each of the VDs it owned at the failure depends on a current state of that VD:

VD already completely migrated: If the VD was already completely migrated to another storage managing module, the pertinent physical segments are accounted as free.

VD migration not started: when the VD is in a data-migration pending state or in any preliminary state, either a backwards rebuild or a forwards rebuild may take place. Backwards rebuild may result in smaller data transfers than a forwards rebuild; however, multiple forward-rebuild operations are more distributed across many of the domain drives as opposed to multiple backwards-rebuild that all copy data to a smaller number of drives. Optionally, backwards rebuild is selected when the amount of data to be backward-transferred divided by the number of drives (or # of spindles) of the recovering storage managing module 107 is smaller than the amount of data to be forward-transferred divided by the total number of drives (or spindles) of the other storage managing modules 107 in the domain.

VD migration in progress: If a RAID regret is supported then a calculation that compares the residual work for forward-rebuild vs. backwards rebuild optionally takes place, optionally while taking into consideration that the data has already been transferred for this VD migration), and as a result, RAID regret may or may not take place.

As described above a rebalancing module may be used to monitor the mapping structures, and whenever there is a sufficiently unbalanced situation, and/or VDs that request data-migration, for example, storage managing module 107 assignment, necessary actions are taken, optionally according to a priority. As a result, various data-migrations are initiated. As mentioned before, percentage of free and/or used capacity as the way we measure which storage managing module 107 is more free and/or busy. It should be noted that the monitoring may be performed by iteratively polling, for example every several seconds, the storage managing modules 107 and/or receiving notifications from the storage managing modules 107 each time an activity that may change the balance is performed and/or when VD data-migration requests are added. See for example the following:

```
// General Rebalancer Iteration (awakes on events and/or periodically (e.g.,
every 1second)
//First handle the VD specific requests (priority 1 & 2)
01. Loop prty = 1..2:
```

```
{02. If there are priority=prty data-migration requests
{03. Loop on all priority=prty VD requests, in random order.
For each such VD request vd1:
{04. Let vd1p = the VD row partner(s) of vd1
05. Find the storage managing module 107 dest_storage managing module 107
with the highest % of (unused + moving out Physical segments), which is not (the
storage managing module 107 of vd1 or any of the Storage managing modules
107 assigned to vd1p)
06. If dest_storage managing module 107 has insufficient Physical segments for
weight(vd1)
stop the algorithm until the situation changes
07. Update the Storage managing moduleCap of dest_storage managing module
107 and of storage managing module(vd1) to reflect the data-migration
(decrease unused Physical segments of dest_storage managing module, increase
its moving-in Physical segments, and some similar modifications to storage
managing module(vd1)
08. Initiate the data-migration (either explicitly or implicitly), and make
 any necessary updates to the VD structure (e.g., no longer requests
 a data-migration etc.) } } }
// Now let's do priority 3 data-migrations: i.e., if the system is not balanced,
// initiate the relevant data-migrations that, once finished, will result in
// a balanced system.
09. Loop
// If the system is sufficiently balanced, end the algorithm. Note that when we
// evaluate the situation, we do it according to the *planned* state and not the
// *current* state. That's why we measure "unused+moving_out" and
// "at_rest+moving_in".
10. most_unused_storage managing module 107 = the STORAGE MANAGING
MODULE 107 with the highest % of unused + moving_out Physical segments
11. most_inuse_storage managing module 107 = the STORAGE MANAGING
MODULE 107 with the highest % of at_rest + moving_in Physical segments
12. if (unused+moving_out % of most_unused_storage managing module) −
(unused+moving_out % of most_inuse_storage managing module)
< threshold (e.g., 2%)
{13. exit the algorithm (the system is sufficiently balanced) }
// The system is not sufficiently balanced, establish a data-migration
14. Randomly choose a VD vd1 currently assigned to most_inuse_storage
managing module 107 which is not already participating in a data-migration.
15. Update the Storage managing moduleCap structures of most_inuse_storage
managing module 107 and most_unused_storage managing module 107 to
reflect a data-migration of vd1. (If there is no sufficient space in
most_unused_storage managing module 107
then the algorithm should be stopped until the situation changes)
16. Initiate the data-migration (either explicitly or implicitly) of vd1 to
most_unused_storage managing module}
```

As mentioned before, a new storage capacity is not allocated from a remove-pending storage managing module 107 and hence a new VD assignment to a remove-pending storage managing module 107 is not made. When a new event occurs, for example when a new capacity is added, for instance in response to the failing of another storage managing module, the process continues; however, practically, since these events typically cancel all the related migration decisions (but the active ones), an optimization may be put in place to restart this algorithm to a new iteration.

Optionally, data-migration decisions are added to a queue before being executed. Optionally, in use, only a number of decisions are handled in any given moment, for example N pending and/or active decisions. Whenever a data-migration completes, another decision is added. This way, cancelling the decisions by events is more efficient as there are fewer decisions to be cancelled.

As specified in Line 05, when a number of VDs in a row are currently in data-unavailable state and/or request data-migration, one may or more not modify the process to avoid allocating new storage managing modules 107 for data-migration as the actual data-migration cannot take place. This modification is some sort of a trade-off and applying it is not necessarily a best-mode.

As specified in Line 06, 15: "stopping/halting the algorithm" may be achieved in various ways; however, when a new event occurs (e.g., a new storage managing module 107 failure etc.), such an event may actually be considered as a situation change and should cause the algorithm to practically restart to a new iteration. In addition, the algorithm may be modified such that if a specific data-migration decision cannot be met (e.g. capacity wise) then the algorithm should skip that decision and continue to the next one and/or or tries to find a different storage managing module 107 to the problematic data-migration decision.

As specified in Line 12, the threshold may be defined in percentage terms, in absolute terms or in combination of the above.

Optionally, data-migrations operations other than rebuild are avoided or reduced in prevalence while a rebuild is in progress, or minimizes other data-migrations, or minimizes/avoids data-migrations affecting storage managing modules 107 in which rebuild is in progress (where rebuild may be a forwards and/or a backwards one).

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems and methods will be developed and the scope of the term a drive, a computing unit, a processor, and a module is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of managing a distributed storage space, comprising;
    mapping a plurality of replica sets to a plurality of storage managing modules installed in a plurality of computing units, each of the plurality of storage managing modules manages access of at least one storage consumer application to replica data of at least one replica of a replica set from the plurality of replica sets, the replica data is stored in at least one drive of a respective the computing unit; wherein the mapping maps blocks of volumes to a respective block address in a respective domain;
    allocating at least one time based credit to at least one of each storage managing module, the at least one drive and the replica data;
    iteratively renewing the time based credit as long a failure of at least one of the storage managing module, the at least one drive and the replica data is not detected; and
    for a storage managing module that does not have a renewed credit, fencing the storage managing module by sending a declaration of failing to the other of the plurality of storage managing modules; wherein a fenced storage managing module stops servicing requests; reallocating the replica data to at least one other of the plurality of storage managing modules when the at least one time based credit is not renewed; wherein reallocating the replica data allows the replica data to be to be managed by other storage managing modules.

2. The method of claim 1, further comprising instructing a respective the storage managing module to reject access of the at least one storage consumer application to the at least one replica.

3. The method of claim 1, further comprising detecting a responsiveness of a respective the storage managing module and determining whether to reallocate the at least one replica to the storage managing module accordingly.

4. The method of claim 1, wherein the plurality of replica sets are part of a volume stored in a plurality of drives managed by the plurality of storage managing modules.

5. The method of claim 1, wherein each replica is divided to be stored in a plurality of volume allocation extents (VAEs) each define a range of consecutive addresses which comprise a physical segment in a virtual disk stored in the at least one drive.

6. The method of claim 1, wherein each of a plurality of volume allocation extents (VAEs) of each of the plurality of replicas is divided to be stored in a plurality of physical segments each of another of a plurality of virtual disks which are managed by the plurality of storage managing modules so that access to different areas of each VAE is managed by different storage managing modules of the plurality of storage managing modules.

7. The method of claim 1, wherein the plurality of computing units comprises a plurality of client terminals selected from a group consisting of desktops, laptops, tablets, and Smartphones .

8. The method of claim 1, wherein each storage managing module manages a direct access of the at least one storage consumer application to a respective the at least one replica.

9. The method of claim 1, wherein the mapping comprises allocating a first generation numerator to mapping element mapping the storage of the replica data, the reallocating comprises updating the first generation numerator; further comprising receiving a request to access the replica data with a second generation numerator and validating the replica data according to a match between the first generation numerator and the second generation numerator.

10. The method of claim 1, further comprising performing a liveness check to the plurality of storage managing modules and performing the renewing based on an outcome of the liveness check.

11. The method of claim 1, wherein the replica set is defined according to a member of a group consisting of the following protocols: Redundant Array of Independent Disks (RAID)-0 protocol, RAID-1, RAID-2, RAID-3, RAID-4, RAID-5 and RAID-6, RAID 10, RAID 20, RAID 30, RAID 40, RAID 50, RAID 60, RAID 01, RAID 02, RAID 03, RAID 04, RAID 05, and RAID 06 ; wherein the replica comprises at least one of a replica of data of a set of data elements and a parity of the set of data elements.

12. The method of claim 1 wherein the mapping is performed by one or more metadata servers.

13. The method of claim 12 wherein the one or more metadata servers manage mapping of a domain.

14. The method of claim 12 wherein the mapping includes a consumer mapping record mapping one or more volumes to one or more storage consumer module(s) including authorizing access to a volume based on the identity of the storage consumer module.

15. The method of claim 1 further comprising:
distributing information mapping from a replica address to a respective storage managing module to storage consumer modules; and
managing mapping information indicative of respective drive addresses by the storage managing modules.

16. A computer tangible non-transitory readable medium comprising computer executable logic enabling execution across one or more processors of:
mapping a plurality of replica sets to a plurality of storage managing modules installed in a plurality of computing units, each of the plurality of storage managing modules manages access of at least one storage consumer application to replica data of at least one replica of a replica set from the plurality of replica sets, the replica data is stored in at least one drive of a respective the computing unit; wherein the mapping maps blocks of volumes to a respective block address in a respective domain;
allocating at least one time based credit to at least one of each storage managing module, the at least one drive and the replica data;
iteratively renewing the time based credit as long a failure of at least one of the storage managing module, the at least one drive and the replica data is not detected; and
for a storage managing module that does not have a renewed credit, fencing the storage managing module by sending a declaration of failing to the other of the plurality of storage managing modules; wherein a fenced storage managing module stops servicing requests; reallocating the replica data to at least one other of the plurality of storage managing modules when the at least one time based credit is not renewed; wherein reallocating the replica data allows the replica data to be to be managed by other storage managing modules.

17. The computer tangible non-transitory readable medium of claim 16 the logic further enabling execution across one or more processors of:
distributing information mapping from a replica address to a respective storage managing module to storage consumer modules; and
managing mapping information indicative of respective drive addresses by the storage managing modules.

18. The computer tangible non-transitory readable medium of claim 16 the logic further enabling execution across one or more processors of performing a liveness check to the plurality of storage managing modules and performing the renewing based on an outcome of the liveness check.

19. The computer tangible non-transitory readable medium of claim 16 wherein the mapping is performed by one or more metadata servers.

20. A system of managing a distributed storage space, comprising;
mapping a plurality of storage managing modules installed in a plurality of computing units and manages the storage of a plurality of replica sets, each storage managing module manages access of at least one storage consumer application to replica data of at least one replica of a replica set from the plurality of replica sets, the replica data is stored in at least one drive of a respective the computing unit; wherein the mapping maps blocks of volumes to a respective block address in a respective domain; and a central node which allocates at least one time based credit to at least one of each storage managing module and the replica data;

wherein the central node iteratively renews the time based credit as long a failure of at least one of the storage managing module, the at least one drive and the replica data is not detected; and for a storage managing module that does not have a renewed credit, fencing the storage managing module by sending a declaration of failing to the other of the plurality of storage managing modules; wherein a fenced storage managing module stops servicing requests; further comprising, reallocating the replica data to at least one other of the plurality of storage managing modules when the at least one time based credit is not renewed; wherein reallocating the replica data allows the replica data to be to be managed by other storage managing modules; wherein the mapping maps blocks of volumes to a respective block address in a respective domain; reallocating the replica data to at least one other of the plurality of storage managing modules when the at least one time based credit is not renewed: wherein reallocating the replica data allows the replica data to be to be managed by other storage managing modules.

* * * * *